United States Patent
Adjakple et al.

(10) Patent No.: US 9,924,413 B2
(45) Date of Patent: Mar. 20, 2018

(54) METHOD AND APPARATUS FOR SUPPORTING LOCAL IP ACCESS AND SELECTED IP TRAFFIC OFFLOAD

(75) Inventors: Pascal M. Adjakple, Great Neck, NY (US); Saad Ahmad, Montreal (CA); Mahmoud Watfa, St. Leonard (CA); Ulises Olvera-Hernandez, Kirkland (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 13/535,961

(22) Filed: Jun. 28, 2012

(65) Prior Publication Data
US 2013/0003697 A1    Jan. 3, 2013

Related U.S. Application Data

(60) Provisional application No. 61/503,669, filed on Jul. 1, 2011, provisional application No. 61/543,102, filed
(Continued)

(51) Int. Cl.
*H04W 36/00* (2009.01)
*H04W 76/02* (2009.01)
(Continued)

(52) U.S. Cl.
CPC ........ *H04W 36/0011* (2013.01); *H04W 8/082* (2013.01); *H04W 12/06* (2013.01);
(Continued)

(58) Field of Classification Search
CPC . H04W 8/082; H04W 76/022; H04W 84/045; H04W 12/06; H04W 28/0268;
(Continued)

(56) References Cited

U.S. PATENT DOCUMENTS 8,400,921 B2 * 3/2013 Grayson et al. .............. 370/232
8,477,724 B2 * 7/2013 Bakker et al. ................ 370/331
(Continued)

FOREIGN PATENT DOCUMENTS

WO    2012/033774 A2    3/2012

OTHER PUBLICATIONS

Third Generation Partnership Project, "Technical Specification Group Services and System Aspects; General Packet Radio Service (GPRS); Service description; Stage 2 (Release 1999)," 3GPP TS 23.060 V3.17.0 (Dec. 2006).
(Continued)

*Primary Examiner* — Ayaz Sheikh
*Assistant Examiner* — Debebe Asefa
(74) *Attorney, Agent, or Firm* — Volpe and Koenig, P.C.

(57) ABSTRACT

A method and apparatus for home Node-B (HNB) mobility with a local IP access (LIPA) packet data network (PDN) connection are described. A target home node-B (HNB) may receive a handover request message from a source HNB to handover a wireless transmit/receive unit (WTRU). A path switch request may be transmitted to a local gateway (LGW) to change a downlink data path towards the target HNB in response to the handover request message. The LGW may act as a mobility management and local mobility anchor for the handover; and informing an HNB gateway (GW) about the handover so that the downlink data path for core network (CN) traffic is modified towards the target HNB.

18 Claims, 21 Drawing Sheets

Related U.S. Application Data on Oct. 4, 2011, provisional application No. 61/544,997, filed on Oct. 7, 2011.

(51) Int. Cl.
| | |
|---|---|
| *H04W 84/04* | (2009.01) |
| *H04W 8/08* | (2009.01) |
| *H04W 48/16* | (2009.01) |
| *H04W 12/06* | (2009.01) |

(52) U.S. Cl.
CPC ......... *H04W 48/16* (2013.01); *H04W 76/022* (2013.01); *H04W 84/045* (2013.01)

(58) Field of Classification Search
CPC ..... H04W 36/12; H04W 48/16; H04W 48/17; H04W 64/00; H04W 76/02; H04W 76/023; H04W 76/041; H04W 80/04; H04W 88/08; H04W 88/16
USPC .................................................. 370/254–350
See application file for complete search history.

(56) References Cited

U.S. PATENT DOCUMENTS

| | | | | |
|---|---|---|---|---|
| 8,509,148 | B2* | 8/2013 | Gleixner et al. ............. | 370/328 |
| 8,588,793 | B2* | 11/2013 | Tomici et al. ................ | 455/445 |
| 8,873,507 | B2* | 10/2014 | Chan ..................... | H04W 8/082 |
| | | | | 370/331 |
| 9,019,923 | B2* | 4/2015 | Laitila et al. ................. | 370/329 |
| 9,021,072 | B2* | 4/2015 | Atreya .................. | H04W 12/08 |
| | | | | 370/230 |
| 2010/0041405 | A1* | 2/2010 | Gallagher et al. ............ | 455/436 |
| 2011/0019644 | A1 | 1/2011 | Cheon et al. | |
| 2011/0134888 | A1* | 6/2011 | Lin et al. ...................... | 370/335 |
| 2012/0207137 | A1 | 8/2012 | Zhou et al. | |
| 2013/0028237 | A1* | 1/2013 | Cheng et al. ................ | 370/331 |
| 2013/0058292 | A1* | 3/2013 | Wang et al. .................. | 370/329 |
| 2014/0153489 | A1 | 6/2014 | Perras et al. | |

OTHER PUBLICATIONS

Third Generation Partnership Project, "Technical Specification Group Services and System Aspects; General Packet Radio Service (GPRS); Service description; Stage 2 (Release 4)," 3GPP TS 23.060 V4.11.0 (Dec. 2006).
Third Generation Partnership Project, "Technical Specification Group Services and System Aspects; General Packet Radio Service (GPRS); Service description; Stage 2 (Release 5)," 3GPP TS 23.060 V5.13.0 (Dec. 2006).
Third Generation Partnership Project, "Technical Specification Group Services and System Aspects; General Packet Radio Service (GPRS); Service description; Stage 2 (Release 6)," 3GPP TS 23.060 V6.15.0 (Dec. 2006).
Third Generation Partnership Project, "Technical Specification Group Services and System Aspects; General Packet Radio Service (GPRS); Service description; Stage 2 (Release 7)," 3GPP TS 23.060 V7.11.0 (Jun. 2011).
Third Generation Partnership Project, "Technical Specification Group Services and System Aspects; General Packet Radio Service (GPRS); Service description; Stage 2 (Release 8)," 3GPP TS 23.060 V8.13.0 (Jun. 2011).
Third Generation Partnership Project, "Technical Specification Group Services and System Aspects; General Packet Radio Service (GPRS); Service description; Stage 2 (Release 8)," 3GPP TS 23.060 V8.15.0 (Mar. 2012).
Third Generation Partnership Project, "Technical Specification Group Services and System Aspects; General Packet Radio Service (GPRS); Service description; Stage 2 (Release 9)," 3GPP TS 23.060 V9.9.0 (Jun. 2011).
Third Generation Partnership Project, "Technical Specification Group Services and System Aspects; General Packet Radio Service (GPRS); Service description; Stage 2 (Release 9)," 3GPP TS 23.060 V9.12.0 (Mar. 2012).
Third Generation Partnership Project, "Technical Specification Group Services and System Aspects; General Packet Radio Service (GPRS); Service description; Stage 2 (Release 10)," 3GPP TS 23.060 V10.4.0 (Jun. 2011).
Third Generation Partnership Project, "Technical Specification Group Services and System Aspects; General Packet Radio Service (GPRS); Service description; Stage 2 (Release 8)," 3GPP TS 23.060 V10.8.1 (Jun. 2012).
Third Generation Partnership Project, "Technical Specification Group Services and System Aspects; General Packet Radio Service (GPRS); Service description; Stage 2 (Release 11)," 3GPP TS 23.060 V11.2.0 (Jun. 2012).
Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.14.0 (Jun. 2011).
Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.16.0 (Mar. 2012).
Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.9.0 (Jun. 2011).
Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.13.0 (Jun. 2012).
Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.4.0 (Jun. 2011).
Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.8.0 (Jun. 2012).
Third Generation Partnership Project, "Technical Specification Group Services and System Aspects; General Packet Radio Service (GPRS) enhancements for Evolved Universal Terrestrial Radio Access Network (E-UTRAN) access (Release 11)," 3GPP TS 23.401 V11.2.0 (Jun. 2012).
Third Generation Partnership Project, "Technical Specification Group Core Network; NAS Functions related to Mobile Station (MS) in idle mode (Release 1999)," 3GPP TS 23.122 V3.10.0 (Sep. 2003).
Third Generation Partnership Project, "Technical Specification Group Core Network; NAS Functions related to Mobile Station (MS) in idle mode (Release 4)," 3GPP TS 23.122 V4.4.0 (Sep. 2003).
Third Generation Partnership Project, "Technical Specification Group Core Network; NAS Functions related to Mobile Station (MS) in idle mode (Release 5)," 3GPP TS 23.122 V5.3.0 (Sep. 2003).
Third Generation Partnership Project, "Technical Specification Group Core Network and Terminals; Non-Access-Stratum (NAS) functions related to Mobile Station (MS) in idle mode (Release 6)," 3GPP TS 23.122 V6.5.0 (Jun. 2005).
Third Generation Partnership Project, "Technical Specification Group Core Network and Terminals; Non-Access-Stratum (NAS) functions related to Mobile Station (MS) in idle mode (Release 7)," 3GPP TS 23.122 V7.12.1 (Apr. 2008).
Third Generation Partnership Project, "Technical Specification Group Core Network and Terminals; Non-Access-Stratum (NAS)

(56) References Cited

OTHER PUBLICATIONS functions related to Mobile Station (MS) in idle mode (Release 8)," 3GPP TS 23.122 V8.12.0 (Jun. 2011).
Third Generation Partnership Project, "Technical Specification Group Core Network and Terminals; Non-Access-Stratum (NAS) functions related to Mobile Station (MS) in idle mode (Release 9)," 3GPP TS 23.122 V9.6.0 (Jun. 2011).
Third Generation Partnership Project, "Technical Specification Group Core Network and Terminals; Non-Access-Stratum (NAS) functions related to Mobile Station (MS) in idle mode (Release 10)," 3GPP TS 23.122 V10.4.0 (Jun. 2011).
Third Generation Partnership Project, "Technical Specification Group Core Network and Terminals; Non-Access-Stratum (NAS) functions related to Mobile Station (MS) in idle mode (Release 10)," 3GPP TS 23.122 V10.5.0 (Sep. 2011).
Third Generation Partnership Project, "Technical Specification Group Core Network and Terminals; Non-Access-Stratum (NAS) functions related to Mobile Station (MS) in idle mode (Release 11)," 3GPP TS 23.122 V11.2.0 (Jun. 2012).
Third Generation Partnership Project, "Technical Specification Group Core Network and Terminals; Allowed Closed Subscriber Group (CSG) list; Management Object (MO) (Release 8)," 3GPP TS 24.285 V8.5.0 (Sep. 2010).
Third Generation Partnership Project, "Technical Specification Group Core Network and Terminals; Allowed Closed Subscriber Group (CSG) list; Management Object (MO) (Release 9)," 3GPP TS 24.285 V9.4.0 (Dec. 2010).
Third Generation Partnership Project, "Technical Specification Group Core Network and Terminals; Allowed Closed Subscriber Group (CSG) list; Management Object (MO) (Release 10)," 3GPP TS 24.285 V10.2.0 (Dec. 2010).
ZTE, "Comparison of stand-alone L-GW solution with Sxx interface," 3GPP TSG SA WG2 Meeting #83, S2-100514 (Feb. 21-25, 2011).
ZTE, "LIPA mobility based on direct X2/lurh," SA WG2 Meeting #85, S2-112321 (May 16-20, 2011).
NEC, "Architectural Requirements for SIPTO for the local network," 3GPP TSG SA WG2 Meeting #83, S2-111270 (Feb. 21-25, 2011).
Panasonic, "LIPA mobility support with standalone LGW," SA WG2 Meeting #85, TD S2-112332 (May 16-20, 2011).
SA WG2, "New WID: LIPA Mobility and SIPTO at the Local Network," TSG SA Meeting #50, SP-100705 (Dec. 13-15, 2010).
Third Generation Partnership Project, "Technical Specification Group Services and System Aspects; LIPA Mobility and SIPTO at the Local Network; (Release 11)," 3GPP TR 23.859 V0.2.0 (Apr. 2011).
Third Generation Partnership Project, "Technical Specification Group Services and System Aspects; LIPA Mobility and SIPTO at the Local Network; (Release 12)," 3GPP TR 23.859 V0.5.0 (May 2012).
Third Generation Partnership Project, "Technical Specification Group Services and System Aspects; Local IP Access and Selected IP Traffic Offload (LIPA-SIPTO) (Release 10)," 3GPP TR 23.829 V10.0.0 (Mar. 2011).
Third Generation Partnership Project, "Technical Specification Group Services and System Aspects; Local IP Access and Selected IP Traffic Offload (LIPA-SIPTO) (Release 10)," 3GPP TR 23.829 V10.0.1 (Oct. 2011).
Third Generation Partnership Project, "Technical Specification Group Services and System Aspects; General Packet Radio Service (GPRS); Service description; Stage 2 (Release 10)," 3GPP TS 23.060 V10.8.1 (Jun. 2012).
Huawei et al., "LHN identification using the LHN-ID," 3GPP TSG SA WG2 Meeting #85, S2-112830, Xi'an, China (May 16-20, 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.7.0 (Mar. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.9.0 (Dec. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.4.0 (Jun. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.7.0 (Mar. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.1.0 (Mar. 2012).
Third Generation Partnership Project, "Technical Specification Group Radio Access Network; Evolved Universal Terrestrial Radio Access Network (E-UTRAN); S1 Application Protocol (S1AP) (Release 8)," 3GPP TS 36.413 V8.10.0 (Jun. 2010).
Third Generation Partnership Project, "Technical Specification Group Radio Access Network; Evolved Universal Terrestrial Radio Access Network (E-UTRAN); S1 Application Protocol (S1AP) (Release 9)," 3GPP TS 36.413 V9.7.0 (Jun. 2011).
Third Generation Partnership Project, "Technical Specification Group Radio Access Network; Evolved Universal Terrestrial Radio Access Network (E-UTRAN); S1 Application Protocol (S1AP) (Release 9)," 3GPP TS 36.413 V9.8.0 (Dec. 2011).
Third Generation Partnership Project, "Technical Specification Group Radio Access Network; Evolved Universal Terrestrial Radio Access Network (E-UTRAN); S1 Application Protocol (S1AP) (Release 10)," 3GPP TS 36.413 V10.2.0 (Jun. 2011).
Third Generation Partnership Project, "Technical Specification Group Radio Access Network; Evolved Universal Terrestrial Radio Access Network (E-UTRAN); S1 Application Protocol (S1AP) (Release 10)," 3GPP TS 36.413 V10.5.0 (Mar. 2012).
Third Generation Partnership Project, "Technical Specification Group Core Network and Terminals; Domain Name System Procedures; Stage 3 (Release 8)," 3GPP TS 29.303 V8.4.0 (Mar. 2010).
Third Generation Partnership Project, "Technical Specification Group Core Network and Terminals; Domain Name System Procedures; Stage 3 (Release 9)," 3GPP TS 29.303 V9.4.0 (Jun. 2011).
Third Generation Partnership Project, "Technical Specification Group Core Network and Terminals; Domain Name System Procedures; Stage 3 (Release 10)," 3GPP TS 29.303 V10.2.0 (Jun. 2011).
Third Generation Partnership Project, "Technical Specification Group Core Network and Terminals; Domain Name System Procedures; Stage 3 (Release 10)," 3GPP TS 29.303 V10.3.0 (Sep. 2011).
Third Generation Partnership Project, "Technical Specification Group Core Network and Terminals; Domain Name System Procedures; Stage 3 (Release 11)," 3GPP TS 29.303 V11.1.0 (Jun. 2012).

* cited by examiner

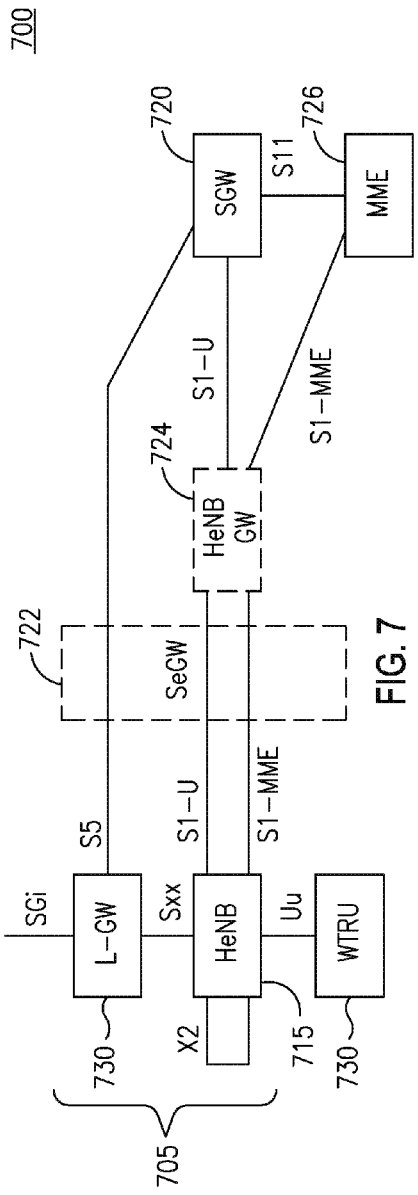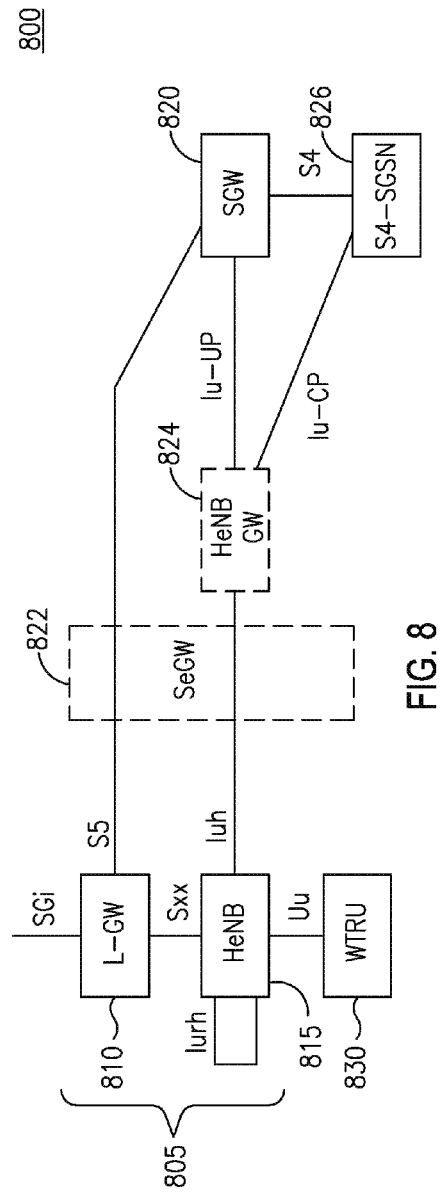

METHOD AND APPARATUS FOR SUPPORTING LOCAL IP ACCESS AND SELECTED IP TRAFFIC OFFLOAD

CROSS REFERENCE TO RELATED APPLICATIONS

This application claims the benefit of U.S. provisional application No. 61/503,669, filed Jul. 1, 2011, U.S. provisional application No. 61/543,102, filed Oct. 4, 2011, and U.S. provisional application No. 61/544,997, filed Oct. 7, 2011, the contents of which are hereby incorporated by reference herein.

FIELD OF THE INVENTION

This application is related to wireless communications.

BACKGROUND

Local Internet Protocol (IP) access (LIPA) may be used to provide an IP connection to a local network using the radio access of a home Node-B (HNB) or a home evolved Node-B (HeNB), (collectively HeNB). As a user changes location, the user may connect to the local network via a macro network coverage area, (i.e., a macro cell, or an HeNB that is not part of the local network). This is referred to as a managed remote access (MRA) session, (i.e., a remote LIPA (RIPA)). When the user moves into the coverage area of the local network, the MRA session is then continued as a LIPA session.

In one scenario, a user may initiate a LIPA session in a local network and then move to the macro network coverage area and continue the session as a MRA session where the actual cell, (macro or HeNB), does not connect to the local network. For example, a wireless transmit/receive unit (WTRU) with a LIPA session may move to an HeNB that is not part of the local network. Thus, the LIPA session may be continued as a MRA session in a target HeNB.

In another scenario, the WTRU may initiate a MRA session in a serving HeNB that does not connect to the local network. When the user moves into the local network's coverage area and performs a handover (HO) to a target HeNB that is part of the local network, the MRA session is continued as a LIPA session.

However, when the WTRU remains within the local network, (i.e., connects to an HeNB that is part of the local network), the WTRU may not be allowed to access LIPA service from a particular closed subscriber group (CSG), (e.g., due to the WTRU's subscription information or because the CSG does not support LIPA services).

SUMMARY

A method and apparatus for home Node-B (HNB) mobility with a local IP access (LIPA) packet data network (PDN) connection are described. A target home node-B (HNB) may receive a handover request message from a source HNB to handover a wireless transmit/receive unit (WTRU). A path switch request may be transmitted to a local gateway (LGW) to change a downlink data path towards the target HNB in response to the handover request message. The LGW may act as a mobility management and local mobility anchor for the handover; and informing an HNB gateway (GW) about the handover so that the downlink data path for core network (CN) traffic is modified towards the target HNB.

BRIEF DESCRIPTION OF THE DRAWINGS

A more detailed understanding may be had from the following description, given by way of example in conjunction with the accompanying drawings wherein:

FIG. 7 shows an example standalone LGW architecture in an HeNB subsystem for an evolved packet system (EPS);

FIG. 8 shows an example standalone LGW architecture in an HNB subsystem for evolved packet system (EPS);

DETAILED DESCRIPTION

When referred to hereinafter, the terminology "HeNB" and "HNB" will be used interchangeably, and reference to either of them will represent both HeNB and HNB.

Figure 1A:
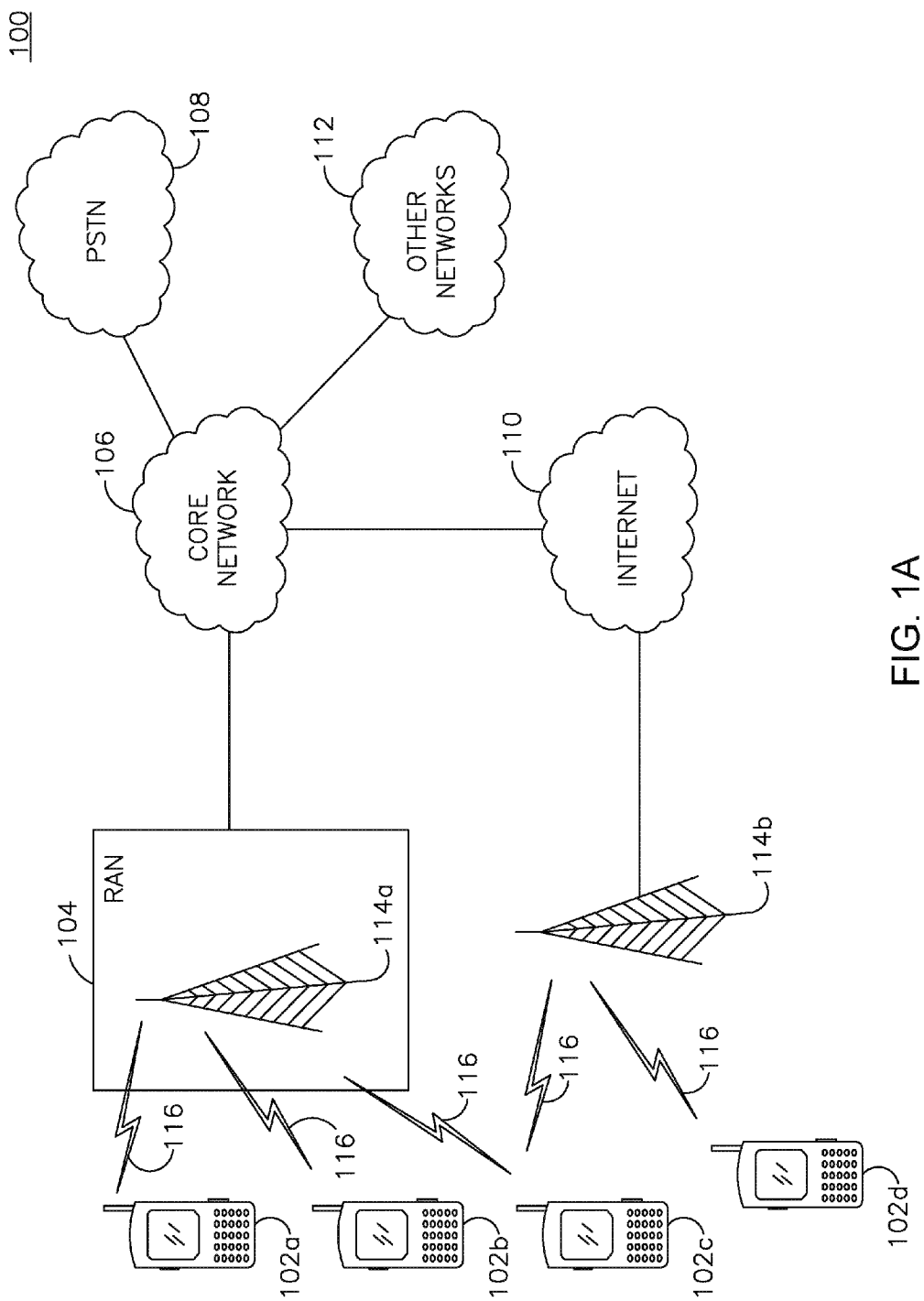
FIG. 1A shows an example communications system in which one or more described embodiments may be implemented.

FIG. 1A shows an example communications system 100 in which one or more described embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include WTRUs 102a, 102b, 102c, 102d, a radio access network (RAN) 104, a core network (CN) 106, a public switched telephone network (PSTN) 108, the Internet 110, and other networks 112, though it will be appreciated that the described embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a notebook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a Node-B, an evolved Node-B (eNB), a Home Node-B (HNB), a Home eNB (HeNB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink (DL) packet access (HSDPA) and/or high-speed uplink (UL) packet access (HSUPA).

In another embodiment, the base station 114a and the WTRUs 102a, 102b, 102c may implement a radio technology such as evolved UTRA (E-UTRA), which may establish the air interface 116 using long term evolution (LTE) and/or LTE-Advanced (LTE-A).

In other embodiments, the base station 114a and the WTRUs 102a, 102b, 102c may implement radio technologies such as IEEE 802.16, (i.e., worldwide interoperability for microwave access (WiMAX)), CDMA2000, CDMA2000 1X, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 114b in FIG. 1A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT, (e.g., WCDMA, CDMA2000, GSM, LTE, LTE-A, and the like), to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over Internet Protocol (VoIP) services to one or more of the WTRUs 102a, 102b, 102c, 102d. For example, the CN 106 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing an E-UTRA radio technology, the CN 106 may also be in communication with another RAN (not shown) employing a GSM radio technology.

The CN 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet Protocol (IP) in the TCP/IP suite. The networks 112 may include wired or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
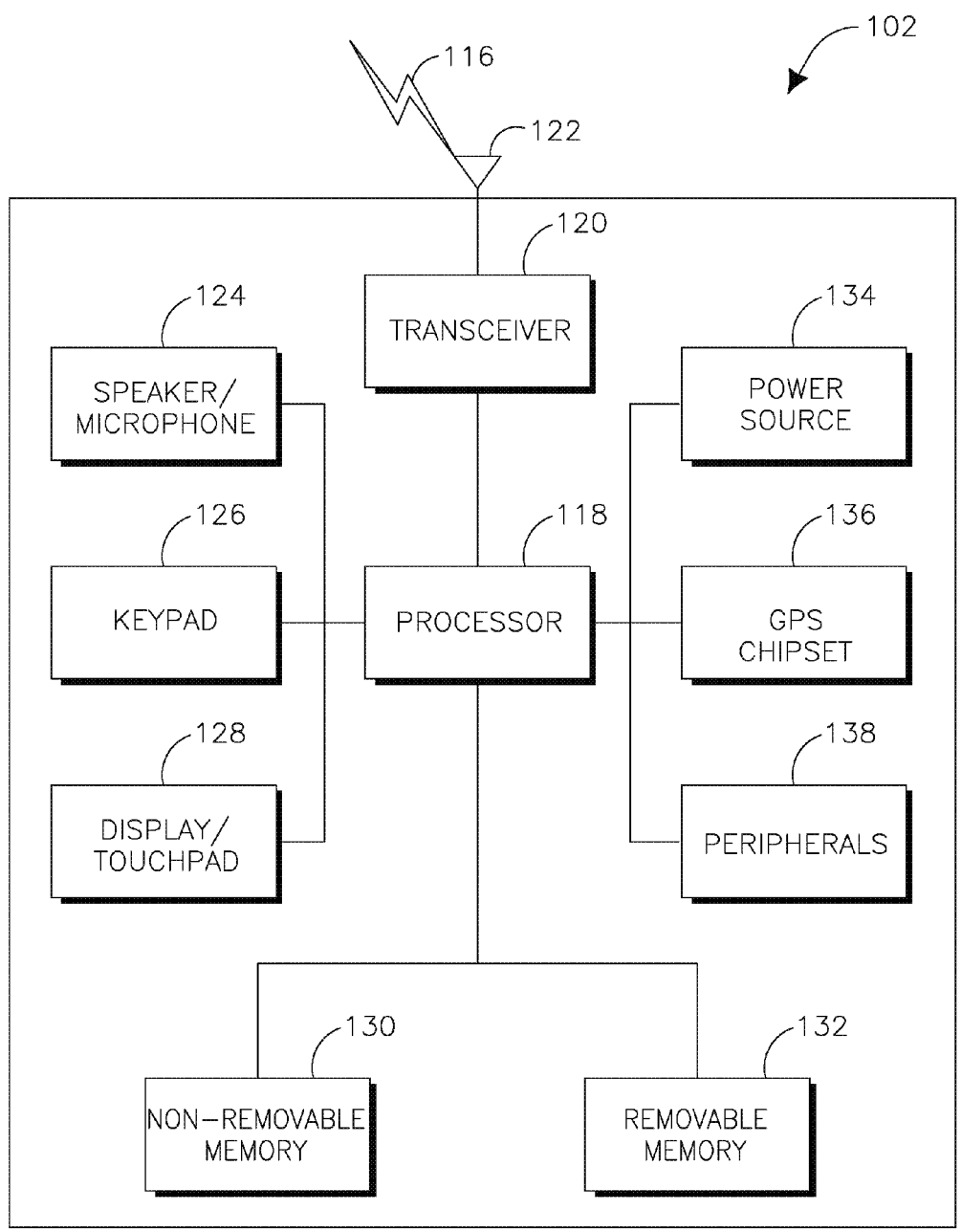
FIG. 1B shows an example wireless transmit/receive unit (WTRU) that may be used within the communications system shown in FIG. 1A.

FIG. 1B shows an example WTRU 102 that may be used within the communications system 100 shown in FIG. 1A. As shown in FIG. 1B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122, (e.g., multiple antennas), for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station, (e.g., base stations 114a, 114b), and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
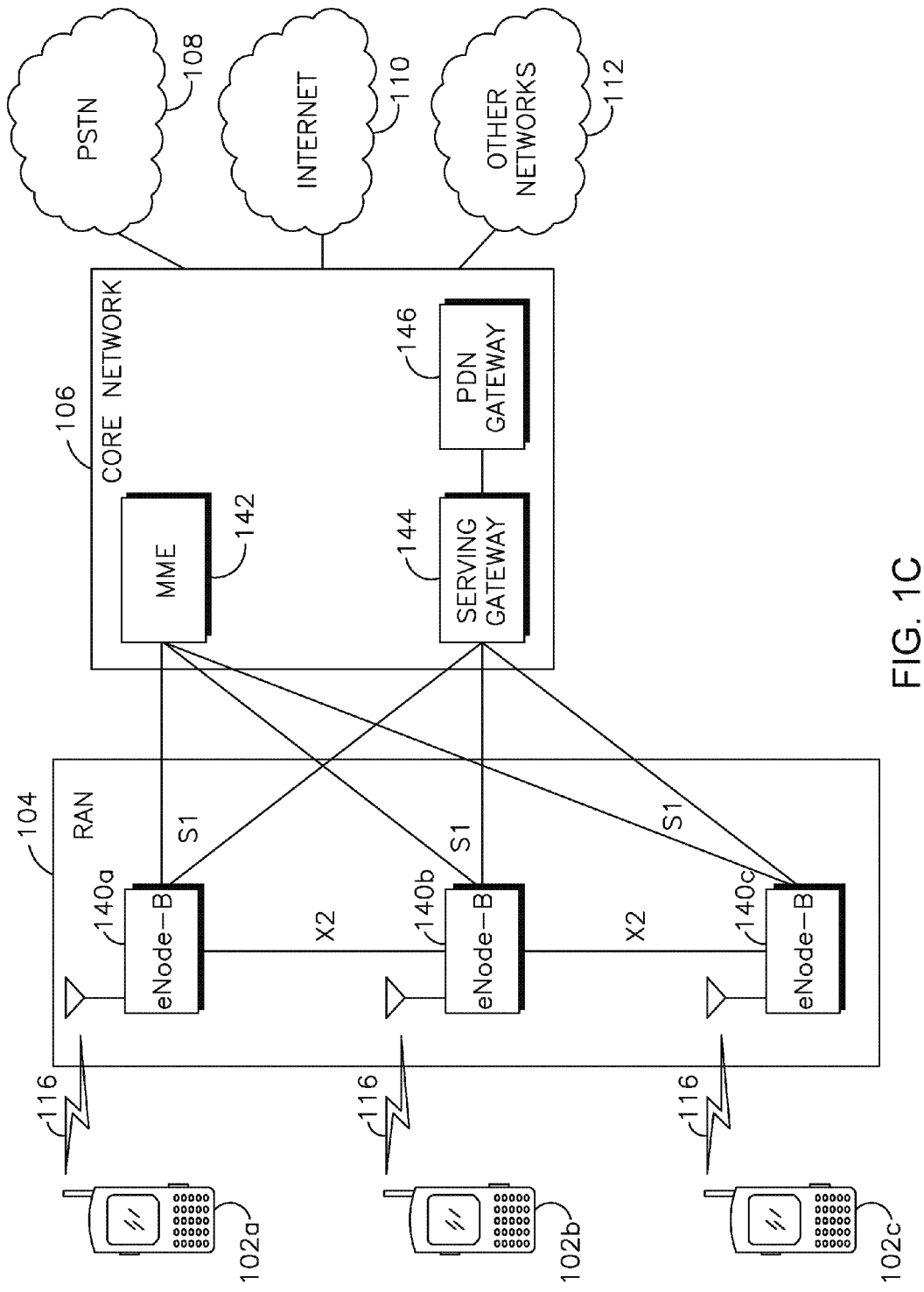
FIG. 1C shows an example radio access network and an example core network (CN) that may be used within the communications system shown in FIG. 1A.

FIG. 1C shows an example RAN 104 and an example CN 106 that may be used within the communications system 100 shown in FIG. 1A. As noted above, the RAN 104 may employ an E-UTRA radio technology to communicate with the WTRUs 102a, 102b, 102c over the air interface 116. The RAN 104 may also be in communication with the CN 106.

The RAN 104 may include eNBs 140a, 140b, 140c, though it will be appreciated that the RAN 104 may include any number of eNBs while remaining consistent with an embodiment. The eNBs 140a, 140b, 140c may each include one or more transceivers for communicating with the WTRUs 102a, 102b, 102c over the air interface 116. In one embodiment, the eNBs 140a, 140b, 140c may implement MIMO technology. Thus, the eNB 140a, for example, may use multiple antennas to transmit wireless signals to, and receive wireless signals from, the WTRU 102a.

Each of the eNBs 140a, 140b, 140c may be associated with a particular cell (not shown) and may be configured to handle radio resource management decisions, handover decisions, scheduling of users in the UL and/or DL, and the like. As shown in FIG. 1C, the eNBs 140a, 140b, 140c may communicate with one another over an X2 interface.

The CN 106 shown in FIG. 1C may include a mobility management entity (MME) 142, a serving gateway 144, and a packet data network (PDN) gateway (GW) 146. While each of the foregoing elements is depicted as part of the CN 106, it will be appreciated that any one of these elements may be owned and/or operated by an entity other than the CN operator.

The MME 142 may be connected to each of the eNBs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNBs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNB handovers, triggering paging when DL data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway, (e.g., an IP multimedia subsystem (IMS) server), that serves as an interface between the CN 106 and the PSTN 108. In addition, the CN 106 may provide the WTRUs 102a, 102b, 102c with access to other networks 112, which may include other wired or wireless networks that are owned and/or operated by other service providers.

Figure 2:
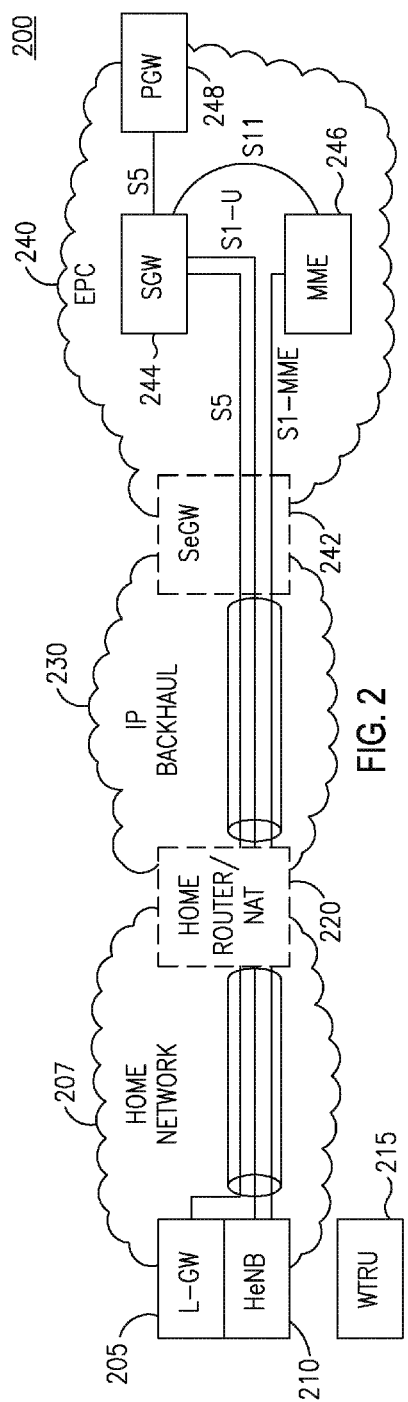
FIG. 2 shows an example system for accessing a local IP network through a local gateway (LGW)

Local IP access (LIPA) may provide an IP connection to a local network (LN) using the radio access of an HeNB. FIG. 2 shows an example system 200 for accessing a local IP network through a local gateway (LGW) 205, which may be collocated on an HeNB 210. The local IP network may be, for example, a home network 207. The local gateway (LGW) 205 may have functions similar to, for example, a packet data network (PDN) gateway (PGW) or a general packet radio service (GPRS) support node (GGSN).

The system 200 may include an evolved packet core (EPC) 240, which may include, but is not limited to, a security gateway (SeGW) 242, a serving gateway (SGW) 244, a mobility management entity (MME) 246, and a packet data network gateway (PGW) 248. The LGW 205 and HeNB 210 may be in communication with the SeGW 242 through an IP backhaul 230 using a home router/ network address translator (NAT) 220. In particular, the LGW 205 and HeNB 210 may be in communication with the SGW 244 and the HeNB may also be in communication with the MME 246, all via the SeGW 242.

As stated herein above, the LGW 205 may be collocated with the HeNB 210. Therefore, if a WTRU 215 moves out of the coverage area of the HeNB 210, (either in an idle mode or connected mode), the LIPA PDN connection may be deactivated. Moreover, for a WTRU 215 in a connected mode and about to perform handover (HO) to another cell, the HeNB 210 may first inform the LGW 205 about the HO, so that the LGW 205 may deactivate the LIPA PDN connection, (this signaling may be sent to the MME 246). After the LIPA PDN connection is deactivated, the WTRU 215 may be handed over to another cell. During the HO, if the MME 246 detects that the LIPA bearer/PDN connection was not deactivated, then the MME 246 may reject the HO.

Figure 3:
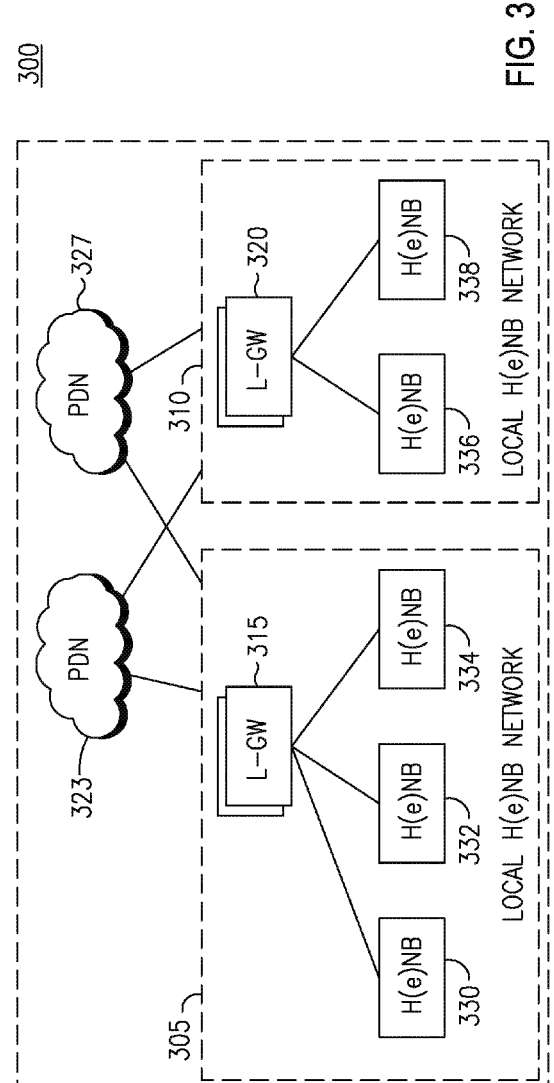
FIG. 3 shows an example standalone LGW architecture for multiple home evolved Node-B (HeNBs)

FIG. 3 shows an example standalone LGW architecture 300 for multiple home evolved Node-B (HeNBs), which allows for continuity of a LIPA PDN connection as the WTRU moves between HeNBs. Multiple HeNBs that connect to the same LGW may be referred to as an HeNB subsystem. In this instance, standalone LGW architecture 300 may include a local HeNB network 305 and a local HeNB network 310, each in communication with a PDN 323 and a PDN 327. The local HeNB network 305 may include a LGW 310 which may be in communication with HeNBs 330, 332 and 334 and the local HeNB network 310 may include a LGW 327 which may be in communication with HeNBs 336 and 338. As shown, LGW 310 and 315 are standalone entities in that they are not collocated on a single HeNB. A WTRU, (not shown), with a LIPA PDN connection to an HeNB subsystem may move across all connected HeNBs while maintaining the LIPA PDN connection. If a WTRU moves out of the HeNB subsystem altogether, (i.e., moves out of the coverage of all the HeNBs that connect to a LGW), then the WTRU's PDN connection for LIPA may be deactivated.

Figure 4:
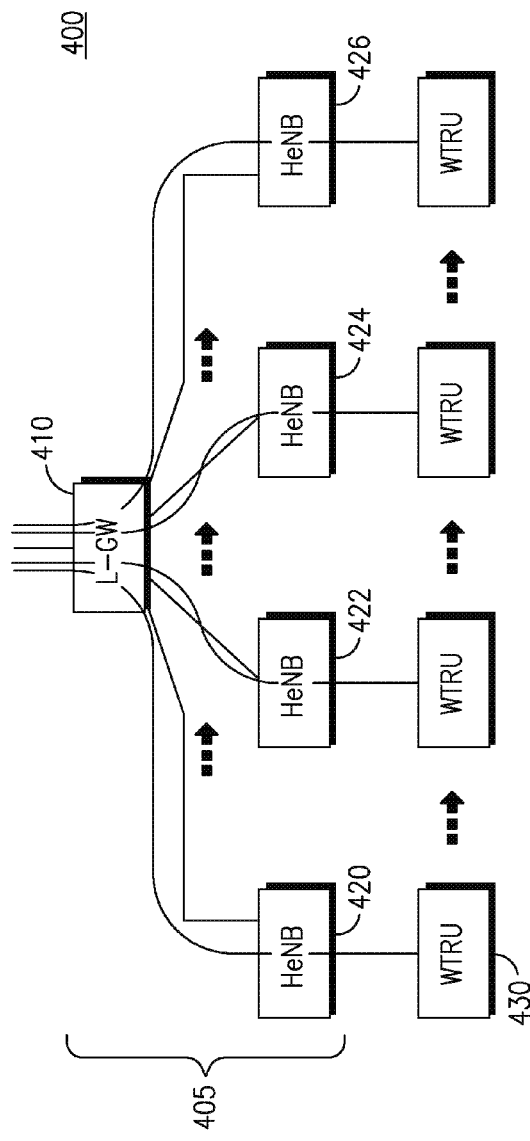
FIG. 4 shows another example standalone LGW architecture for multiple HeNBs.

FIG. 4 shows another example standalone LGW architecture 400 for multiple home evolved Node-B (HeNBs), which allows for continuity of a LIPA PDN connection as the WTRU moves between HeNBs. As stated above, multiple HeNBs that connect to the same LGW may be referred to as an HeNB subsystem. In this instance, standalone LGW architecture 400 may include a local HeNB network 405 which may include a LGW 410 in communication with HeNBs 420, 422, 424 and 426. As shown, LGW 410 is a standalone entity that is not collocated on a single HeNB. A WTRU 430 with a LIPA PDN connection to HeNB subsystem 405 may move across all connected HeNBs 420, 422, 424 and 426 while maintaining the LIPA PDN connection. If a WTRU moves out of the HeNB subsystem 405 altogether, (i.e., moves out of the coverage of all the HeNBs 420, 422, 424 and 426 that connect to LGW 410), then the WTRU's 430 PDN connection for LIPA may be deactivated.

Figure 5:
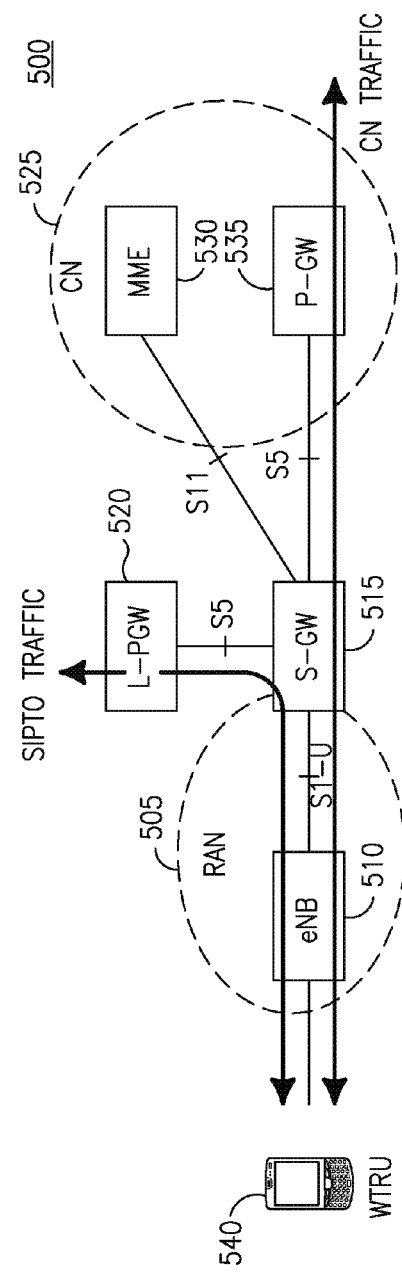
FIG. 5 shows an example of a selected IP traffic offload (SIPTO) service in which a network operator chooses a packet data network gateway (PGW) to offload traffic.

FIG. 5 shows an example of a wireless communications system 500 using a selected IP traffic offload (SIPTO) service, where a network operator may choose a PGW to offload traffic to the Internet. In particular, a WTRU's physical location or IP topological location may make it favorable to select a PGW different from the core network (CN) PGW. The wireless communications system 500 may include a radio access network (RAN) 505 as provided by an eNB 510 in communication with a SGW 515. The SGW 515 may, in turn, be in communications with a local PGW 520 (L-PGW, or also known as LGW), and a CN 525 that may include a MME 530 and a PGW 535. A WTRU 540 may use the SIPTO connection to offload user data to the Internet (not shown) via the LGW 520. SIPTO may be achieved above the RAN, and regardless of whether the radio connection of a WTRU is obtained via an eNB or an HeNB. The selection of another PGW may not be known to the WTRU, and the offload of the WTRU's traffic to the LGW may degrade the user's service experience.

Figure 6:
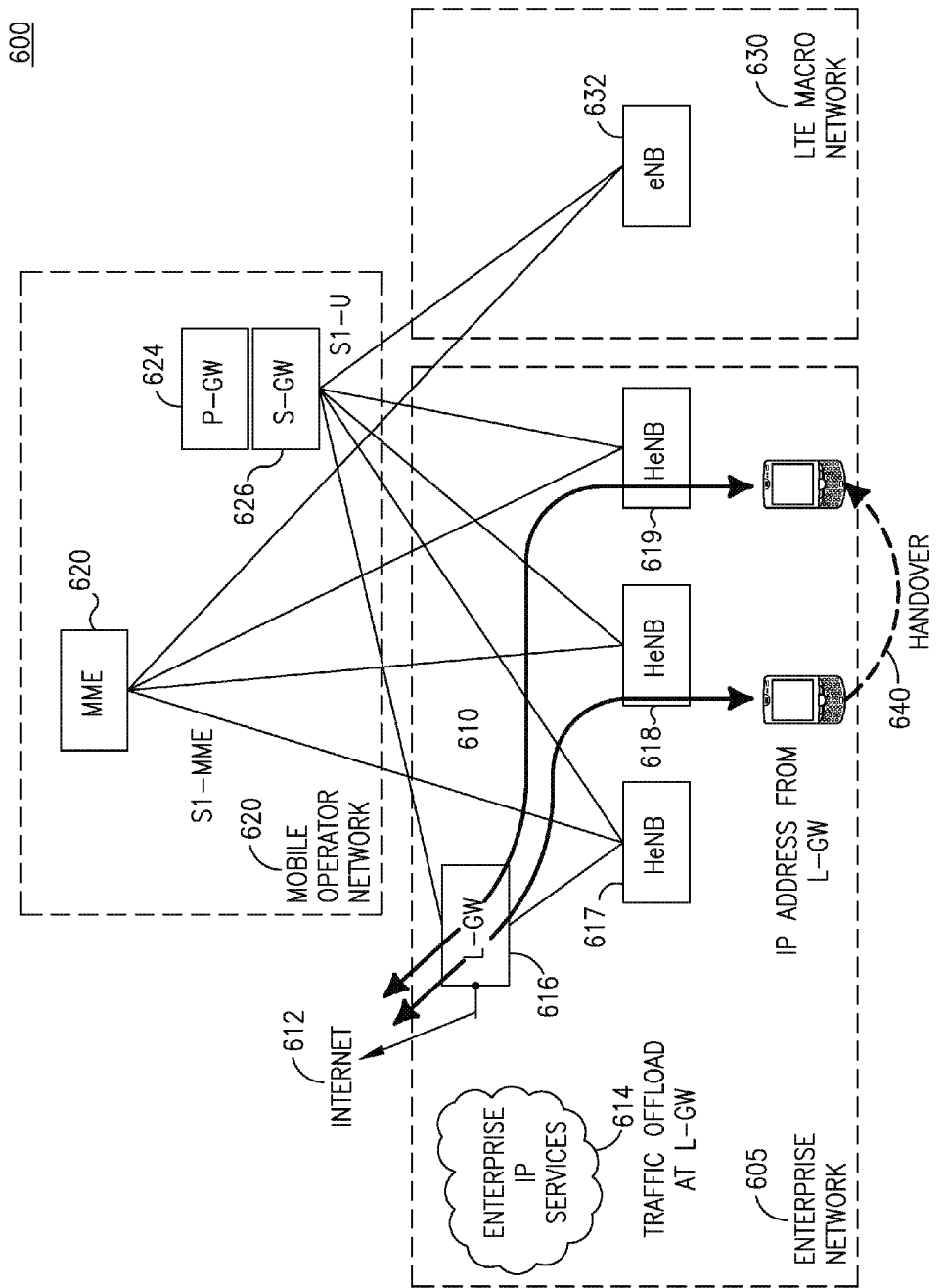
FIG. 6 shows an example offload of user data to the Internet via an LGW that is in the HeNB subsystem.

FIG. 6 shows example architecture 600 for offload of user data to the Internet via a LGW that is on an HeNB subsystem. An enterprise network 605, (i.e., a local network), may include an HeNB subsystem 610 that is connected to the Internet 612 via enterprise IP services 614. The HeNB subsystem 610 may include a LGW 616 that may be in communication with HeNB 617, HeNB 618 and HeNB 619. A mobile operator network (MNO) 620 may include a MME 622, a PGW 624 and SGW 626. A LTE macro network 630 may include an eNB 632, which may be in communication with the MME 622 and SGW 626. The MME 622 and SGW 626 may both be in communication with HeNB 617, HeNB 618 and HeNB 619 and the SGW 626 may also be in communication with LGW 616. A WTRU 640 may be in communication with HeNB 618 or 619 as a result of a handover. In this architecture 600, both LIPA and SIPTO may be possible, (i.e., the LGW 616 may be used to access a local IP network (i.e., LIPA)), while also being able to offload a WTRU's 640 data to the Internet 612 via the same LGW 616.

FIG. 7 shows example standalone LGW architecture 700 for evolved packet system (EPS). The LGW architecture 700 may include an HeNB subsystem 705 that may include a LGW 710 in communication with an HeNB 715. The LGW 710 may be in communication with a SGW 720 via a SeGW 722. The HeNB 715 may be in communication with the SGW 720 and a MME 726 via the SeGW 722 and an HeNB gateway (GW) 724. A WTRU 730 may be in communication with the HeNB 715.

FIG. 8 shows example standalone LGW architecture 800 for EPS. The LGW architecture 800 may include an HNB subsystem 805 that may include a LGW 810 in communication with an HNB 815. The LGW 810 may be in communication with a SGW 820 via a SeGW 822. The HNB 815 may be in communication with the SGW 820 and a S4-Serving GPRS Support Node (SGSN) 826 via the SeGW 822 and an HNB GW 824. A WTRU 830 may be in communication with the HNB 815.

Figure 9:
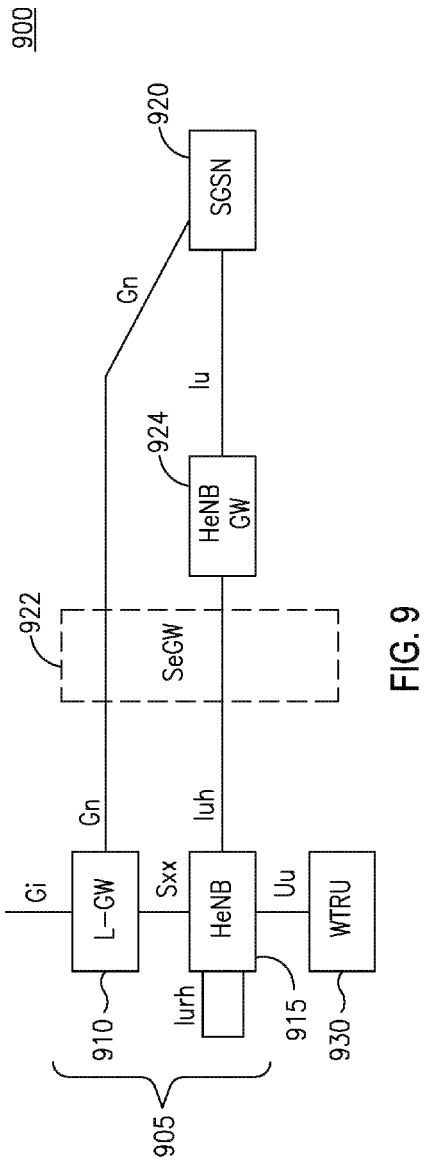
FIG. 9 shows an example standalone LGW architecture for universal mobile telecommunications system (UMTS)

FIG. 9 shows example standalone LGW architecture 900 for universal mobile telecommunication system (UMTS). The LGW architecture 900 may include an HNB subsystem 905 that may include a LGW 910 in communication with an HNB 915. The LGW 910 may be in communication with a SGSN 920 via a SeGW 922. The HNB 915 may be in communication with the SGSN 920 via the SeGW 922 and an HNB GW 924. A WTRU 930 may be in communication with the HNB 915.

Figure 10:
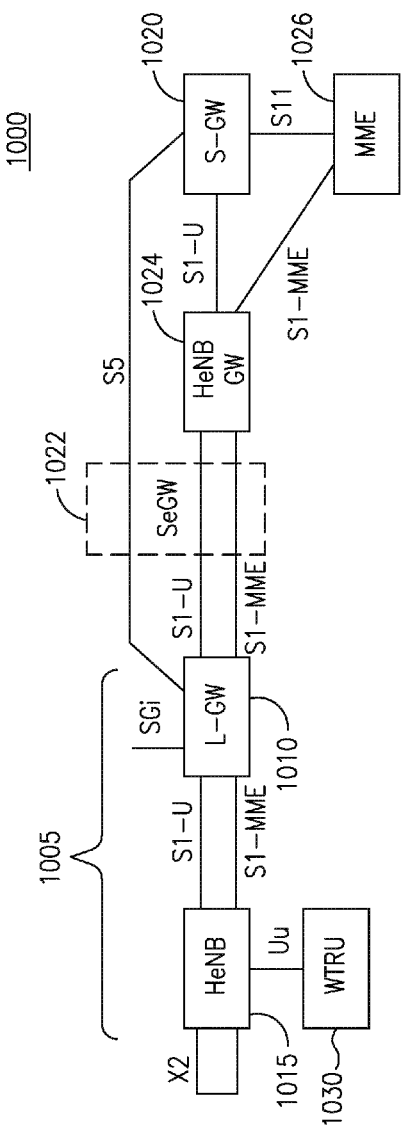
FIG. 10 shows an example standalone LGW on the S1 path in an HeNB subsystem for EPS.

FIG. 10 shows example standalone LGW architecture 1000 on an S1/Iu path in an HeNB subsystem for EPS. The LGW architecture 1000 may include an HeNB subsystem 1005 that may include a LGW 1010 in communication with an HeNB 1015. The LGW 1010 may be in communication with a SGW 1020 and a MME 1026 via a SeGW 1022 and an HeNB GW 1024. A WTRU 1030 may be in communication with the HeNB 1015.

Figure 11:
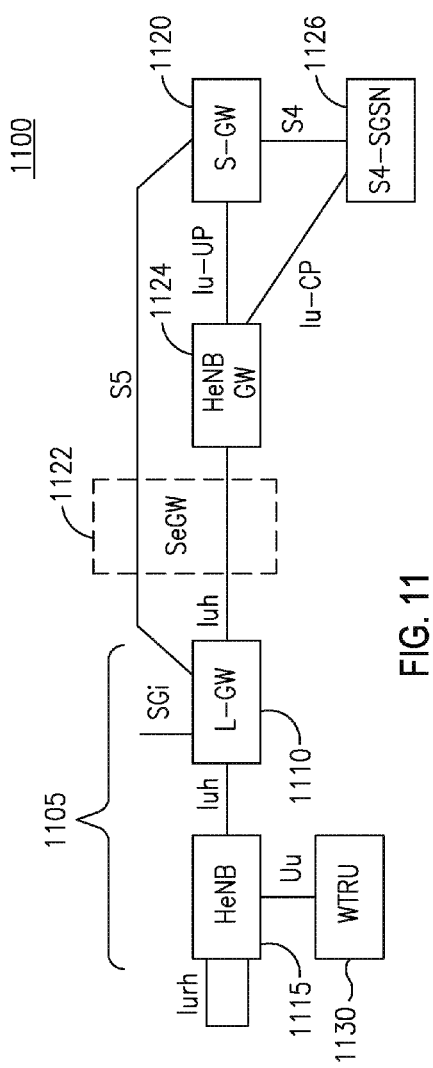
FIG. 11 shows an example standalone LGW on the Iuh path in an HNB subsystem for EPS.

FIG. 11 shows example standalone LGW architecture 1100 on an Iuh path in an HNB subsystem for EPS. The LGW architecture 1105 may include an HNB subsystem 1105 that may include a LGW 1110 in communication with an HNB 1115. The LGW 1110 may be in communication with a SGW 1120 and a S4-SGSN 1126 via a SeGW 1122 and an HNB GW 1124. A WTRU 1130 may be in communication with the HNB 1115.

Figure 12:
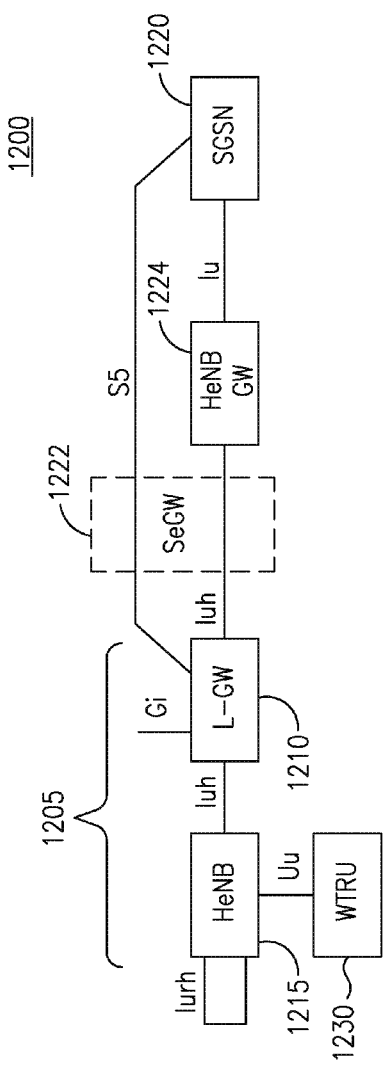
FIG. 12 shows an example standalone LGW on the Iuh path in an HNB subsystem for UMTS.

FIG. 12 shows example standalone LGW architecture 1200 on an Iuh path in an HNB subsystem for UMTS. The LGW architecture 1200 may include an HNB subsystem 1205 that may include a LGW 1210 in communication with an HNB 1215. The LGW 1210 may be in communication with a SGSN 1220 via a SeGW 1222 and also via the SeGW 1222 and an HNB GW 1224. A WTRU 1230 may be in communication with the HNB 1115.

Figure 13:
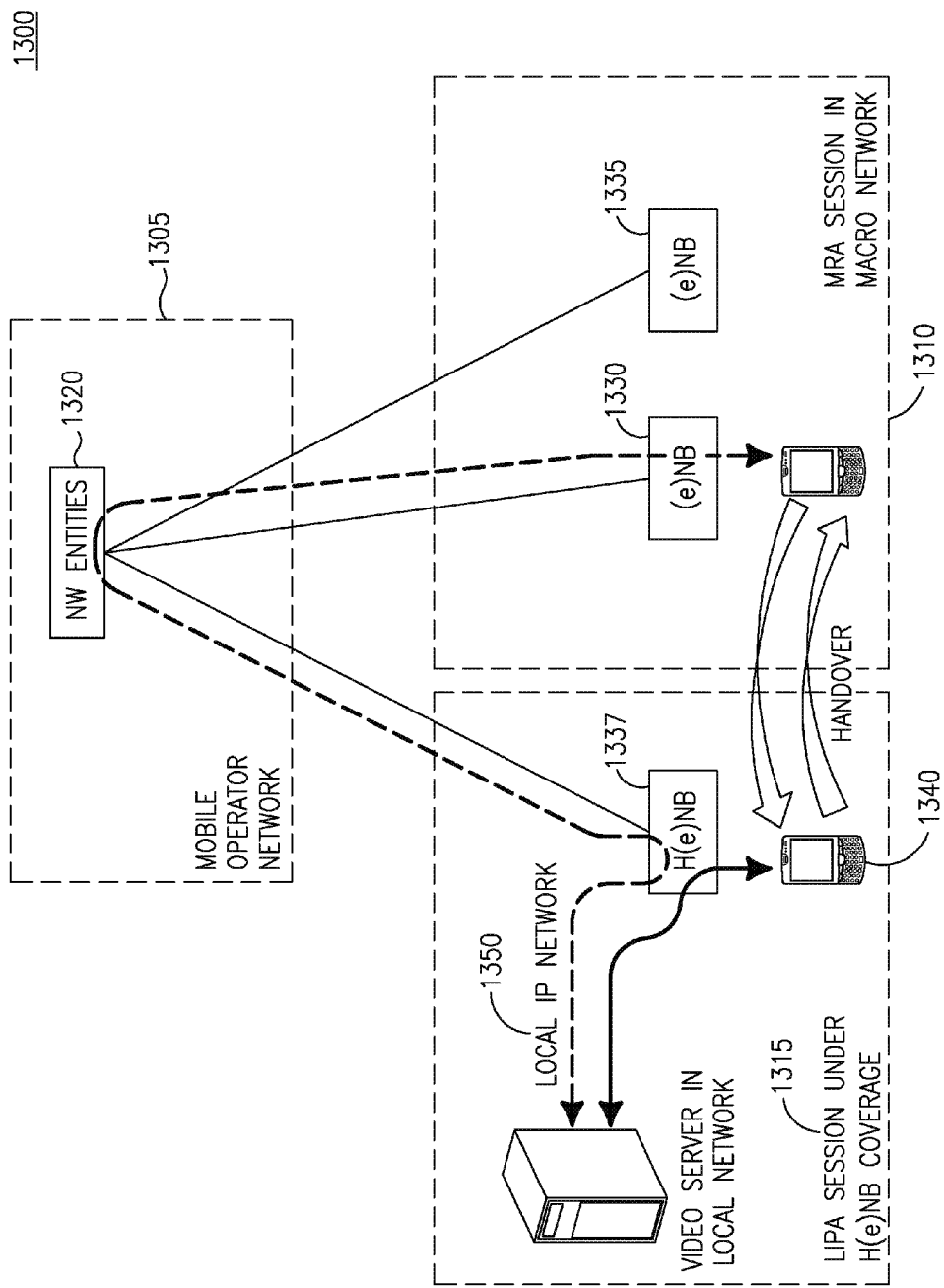
FIG. 13 shows an example system and flow of a user starting a managed remote access (MRA) session in an HeNB that is not part of a local network and then hands off to an HeNB that is part of the local network.

Continuity of data sessions may be desired as users move between local and macro network coverage. FIG. 13 illustrates an example architecture 1300 that may include a mobile operator core network 1305, a macro network 1310 and an HeNB subsystem 1315. The mobile operator core network 1305 may include network (NW) entities 1320, the macro network 1310 may include eNB 1330 and 1335 and the HeNB network 1315 may include an HeNB 1337. A WTRU 1340 may connect to a local network 1350 via the macro network 1310, (i.e. a macro cell, or an HeNB that is not part of a local network). This is referred to as a managed remote access (MRA) or remote IP access (RIPA). That is, a MRA session is when the actual cell, (macro or HeNB), does not connect to the local network. When the WTRU 1340 moves into the coverage area of the local network 1350, the MRA session may then be continued as a LIPA session. The opposite may be possible as well. The WTRU 1340 may start as a LIPA session in the local network 1350, and then move to the macro network 1310, where the LIPA session is continued as a MRA session. That is, a WTRU with a LIPA session may move to an HeNB that is not part of the local network.

Figure 14:
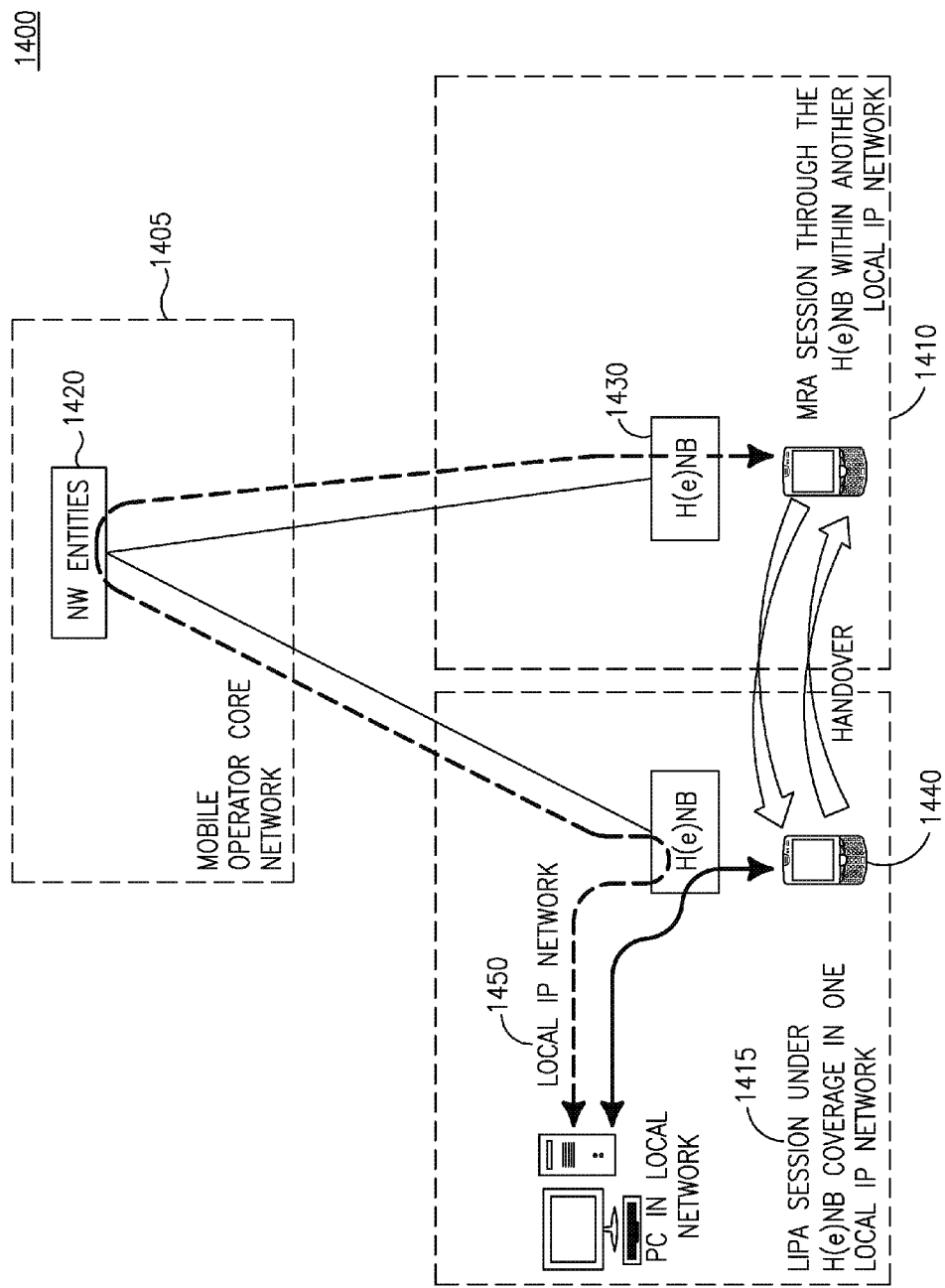
FIG. 14 shows an example system and flow of a user starting a Local Internet Protocol (IP) access (LIPA) session in a local network and moving to a macro network coverage area in which the LIPA session continues as a MRA session.

FIG. 14 illustrates example architecture 1400 that may include a mobile operator CN 1405, an HeNB network 1410 and an HeNB subsystem 1415. The mobile operator CN 1405 may include NW entities 1420, the HeNB network 1410 may include HeNB 1430 and the HeNB subsystem 1415 may include an HeNB 1435. The WTRU 1440 may have a MRA session using HeNB 1430 that does not connect to the local network 1450. When the WTRU 1440 moves into the local network's 1450 coverage and hands off to the HeNB 1435 that is part of the local network 1450, the MRA session is continued as a LIPA session. The examples related to LIPA above may also be applied to SIPTO.

Embodiments for handover procedures, (including mobility in CELL_FACH), and related issues in the context of the architecture options are described below.

HeNB enhanced mobility, (also referred to as optimized mobility), supporting non-core network involved mobility is described. This may include support for LIPA and SIPTO services with a LGW co-located with the HeNB and the architecture configurations where the HeNB and the LGW are not co-located.

Figure 15:
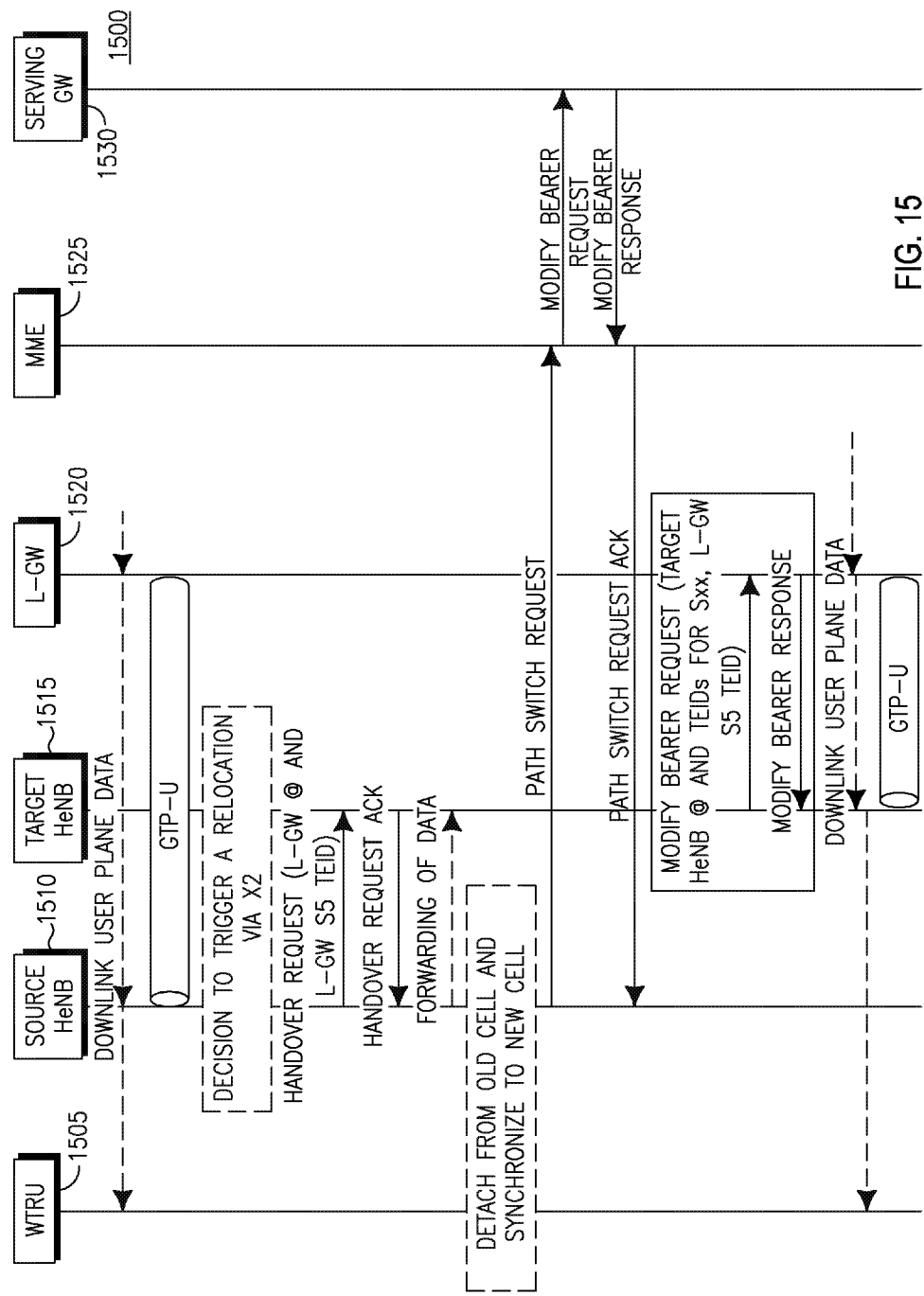
FIG. 15 shows an example signal flow diagram for an inter-HeNB handover procedure using a X2 interface.

FIG. 15 is an example signal flow diagram 1500 for an inter-HeNB handover procedure using a X2 interface. The signaling may flow between WTRU 1505, source HeNB 1510, target HeNB 1515, LGW 1520, MME 1525 and SGW 1530. A downlink user plane data may exist from the LGW 1520 to the source HeNB 1510 and from the source HeNB 1510 to the WTRU 1505. A General Packet Radio Service (GPRS) Tunneling Protocol (GTP) user plane (GTP-U) may exist between the source HeNB 1510 and the LGW 1520. A decision to trigger relocation via the X2 interface may be made (1). A handover request may be sent from the source HeNB 1510 to the target HeNB 1515 (2). A handover request acknowledgement (ACK) may be sent from the target HeNB 1515 to the source HeNB 1510 (3). Data may be forwarded from the source HeNB 1510 to the target HeNB 1515. The WTRU 1505 may detach from the source HeNB 1510 and synchronize to the target HeNB 1515. A path switch request may be sent form the target HeNB 1515 to the MME 1525 (4). A modify bearer request may be sent from the MME 1525 to the SGW 1530 (5) and a modify bearer response may be sent from the SGW 1530 to the MME 1525 (6). A path switch request ACK may be sent from the MME 1525 to the target HeNB 1515 (7). A modify bearer request may be sent from the target HeNB 1515 to the LGW 1520 (8) and a modify bearer response may be sent from the LGW 1520 to the target HeNB 1515 (9). A downlink user plane data may exist from the LGW 1520 to the target HeNB 1515 and from the target HeNB 1515 to the WTRU 1505. A GTP-U may exist between the taret HeNB 1515 and the LGW 1520. The signal flow diagram 1500 is not completely transparent to the core network since the MME 1525 and the SGW 1530 are still involved in the handover procedure.

Figure 16:
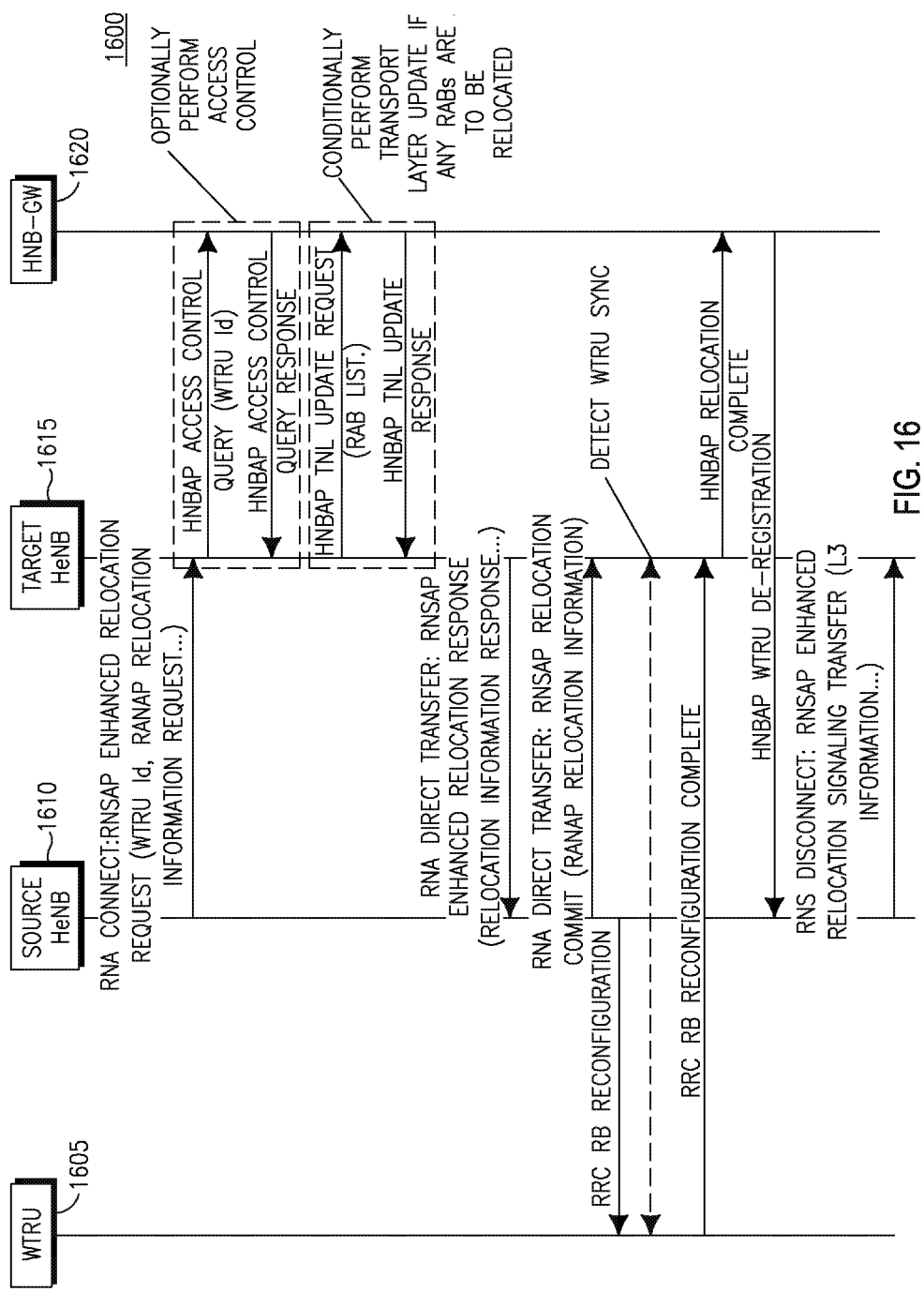
FIG. 16 shows an example signal flow diagram for HNB-to-HNB optimized handover.

FIG. 16 is an example signal flow diagram 1600 for HNB-to-HNB optimized handover. The signaling may flow between WTRU 1605, source HNB 1610, target HNB 1615, and HNG-GW 1620. A Radio Network Subsystem Application Part (RNSAP) User Adaption (RNA) relocation request message may be sent from the source HeNB 1610 to the target HNB 1615 (1). An HNB application part (HNBAP) access control query may be sent from the target HeNB 1615 to the HNB-GW 1620 (2a) and an HNBAP access control query response may be sent from the HNB-GW 1620 to the target HNB 1615 (2b). An HNBAP transport network layer (TNL) update request may be sent from the target HeNB 1615 to the HNB-GW 1620 (3a) and an HNBAP TNL update response may be sent from the HNB-GW 1620 to the target HNB 1615 (3b). A RNA direct transfer/RNSAP enhanced relocation response may be sent from the target HNB 1615 to the source HNB 1610 (4) and a RNA direct transfer/RNSAP relocation commit may be sent from the source HNB 1610 to the target HNB 1615 (5). A radio resource controller (RRC) radio bearer (RB) reconfiguration message may be sent from the source HNB 1610 to the WTRU 1605 (6).

The target HNB 1615 may detect WTRU 1605 synchronization attempts. The RRC RB reconfiguration complete message may be sent from the WTRU 1605 to the target HNB 1615 (7). An HNBAP relocation complete message may be sent from the target HNB 1615 to the HNB-GW 1620 (8). An HNBAP WTRU de-registration message may be sent from the HNB-GW 1620 to the source HNB 1610 (9). The RNA disconnect/RNSAP enhanced relocation signaling transfer message may be sent from the source HNB 1610 to the target HNB 1615 (10). In the case of a UMTS terrestrial radio access network (UTRAN), the HNB-to-HNB optimized handover via an Iurh interface goes through the HNB-GW 1620.

Embodiments for enhanced mobility, (non-core network involved handover or transparent core network handover), procedures are described for the cases where there is a partial handover, (i.e., certain bearers cannot be admitted by the target system due to load conditions or some other reasons). Furthermore, embodiments for non-WTRU involved mobility, (mobility without serving radio network subsystem (SRNS) relocation), in the context of non-core network involved mobility are also described.

There may be a deployment scenario where HeNBs and HNBs are deployed together in the same LN or local home network (LHN), and may be connected to the same LGW. In this case, embodiments for seamless LIPA mobility to be supported between HeNBs and HNBs are also described. These inter-radio access technology (RAT) handover procedures ensure that there is no disruption in the user plane data, and the user experiences the same quality of service (QoS) before and after the handover.

Embodiments for the support of mobility when the WTRU moves from the coverage area of one LGW to another LGW, (i.e., inter LGW mobility), are also described. When there is a change in the LGW, the WTRU's IP address is supposed to change. Embodiments for no interruption in the flow of user data and to forward data from one LGW subsystem to another LGW subsystem in such situations are also described.

Embodiments for non-WTRU related procedures over the S1/Iuh interface are also described. The embodiments consider the impacts from the limitation of supporting one or multiple LGW per LHN, and the issues of tunneling all of the traffic from all of the HeNBs in an LHN through a single LGW, as opposed to tunneling them through multiple LGWs or bypassing the LGW altogether for certain types of traffic.

Currently there is a requirement to deactivate the LIPA service when the WTRU moves out from the LHN. Embodiments to implement this requirement are described. Assuming an LHN identity (LHN-ID) is used, embodiments for using the LHN-ID during connected mode mobility are described.

The current architecture options when considering enterprise deployment, shopping mall deployment, or airport terminals or other dense hot spot deployment may be further optimized to take advantage of the cell density, the close proximity between these cells and the opportunity for cell aggregation or concentration toward the core network.

Embodiments for a RAN sharing use case are also described. RAN sharing in general is about two or more operators sharing their RAN networks. For instance, two operators who have both a third generation (3G) network and deploying long term evolution (LTE) may decide to join an effort in some area while deploying their individual RANs in some other areas. An operator who has the core network may decide to lease or share a RAN from another operator. In the context of HeNB, RAN sharing may take place in the enterprise or shopping mall scenario. For example, employees of company X may have their cellular service subscriptions from different operators which may not be the operator providing the femtocell service to company X. In such a case, the employees may get cellular service from femtocells while on company X's premise through a roaming agreement. However, this assumes the roaming agreement is such that it is not costing more to the employees and they are getting preferential treatment provided by the femtocell network provider providing service to company X.

Another model may be to have RAN sharing between operators. Employees are free to have services from the operator of their choice but benefit from closed subscriber group (CSG) preferential treatment and charging regime through RAN sharing agreements between operators.

Another use case of RAN sharing in the context of HeNB is the shopping mall scenario. There may be a blanket of femtocells deployed throughout the mall. Several operators may provide services to the retailers in the malls through a common mall femto network.

The RAN issues considered here include the interactions between LIPA/SIPTO and RAN sharing especially as it relates to LIPA and SIPTO services and configuration for mobility support, the implications of sharing the LGW between multiple core networks, and the implications when roaming.

Embodiments for the support of equivalent public land mobile network (PLMN), (evolved PLMN (ePLMN)), are described including the support of LIPA/SIPTO services, (impact on session management and mobility management including outbound/inbound handovers), in ePLMNs.

One of the issues is CELL_FACH mobility that occurs in UTRAN. The CELL_FACH state is a sub-state of the RRC CONNECTED state, where the WTRU may be in connected mode but may send and/or receive a small amount of data. In the CELL_FACH state, the WTRU may perform a radio resource control (RRC) signaling procedure, such as a cell update. This may be for several reasons such as expiry of an RRC update timer, to perform data volume reporting, or when the WTRU reselects to another cell and wants to inform the network (RAN) about the reselection of/mobility into a new cell. In CELL_FACH, if a WTRU moves or reselects to another cell, it does so while in connected mode. This is different from the idle mode cell reselection.

After the WTRU reselects another cell while in CELL_FACH state, the target cell/radio network controller (RNC), (the source and target RNC may be the same), may need to fetch the WTRU's context from the source cell so that the services for the WTRU may be maintained.

For the case where a WTRU is connected to an HNB and also has a LIPA PDN connection established at the HNB, the LGW may be co-located with the HNB, or the LGW is standalone. If the WTRU with a LIPA PDN connection operates in CELL_FACH, then there is a possibility, as per existing procedures, that the WTRU performs a cell reselection to another macro cell in the neighborhood. If this happens, the WTRU may, as explained earlier, perform a cell update procedure to inform the RAN/network about its mobility, and hence the selection of a new cell. Thus, the CELL_FACH mobility may be a WTRU-based mobility that occurs in a connected mode. For LIPA mobility, (i.e., handover of a WTRU when there is a LIPA PDN connection), the source HNB, before executing any handover, may inform the LGW about the eventual handover and the LGW will then trigger the release of the PDN connection towards the MME. However, the HNB may not be aware of the WTRU's mobility in CELL_FACH.

Hence, HNB behavior that triggers the release of the LIPA PDN connection and resources may not be used for CELL_FACH mobility. Thus, the LIPA PDN connection may remain setup and the resources may remain in use, even though the WTRU is not in the source cell. A CELL_FACH mobility may not necessarily trigger a non-access stratum (NAS) procedure that, if it occurs, may trigger the SGSN to deactivate the LIPA PDN connection as the SGSN may know the WTRU has moved from the original cell where the LIPA PDN connection was established. Thus, embodiments are described to address CELL_FACH mobility when there is a LIPA PDN connection. Mobility out of the HNB where LIPA PDN connection was established may lead to the deactivation of the LIPA PDN connection. However, when the LGW is stand-alone and the mobility in CELL_FACH to another HNB or macro cell may not necessarily imply or lead to a LIPA PDN deactivation.

For MRA to LIPA handover, or vice versa, the following scenarios may be identified. In a first scenario 1700 shown in FIG. 17, a WTRU 1705 in a cell 1710, (either a macro cell or HeNB cell operating under a closed subscriber group (CSG) only or under CSG in hybrid mode). The main characteristic of the cell 1710 is that it is not part of a local network 1715, which in turn is served by one or more LGWs 1720 that may be collocated with an HeNB 1725. A MRA session may be initiated from outside the local network 1715 with or without LIPA permission.

Figure 18:
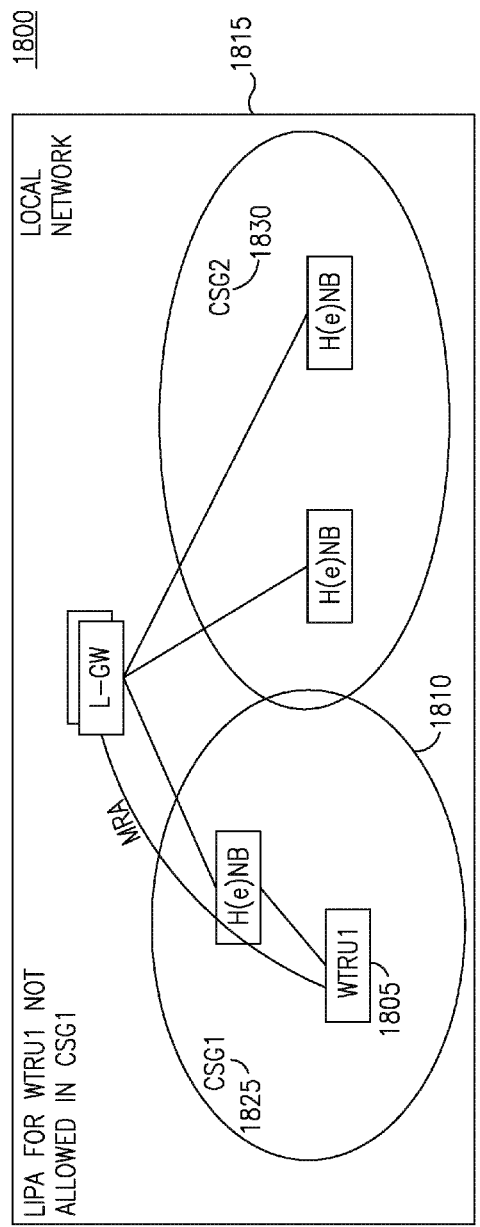
FIG. 18 shows a second scenario in which a MRA session may be initiated from a closed subscriber group (CSG) without LIPA permission within the same local network.

In a second scenario 1800 shown in FIG. 18, a WTRU 1805 may be in a cell 1810 that is part of a local network 1815, (either an HeNB cell providing CSG services or a macro cell providing CSG services). However, the WTRU 1805 is not allowed to get LIPA access from the cell 1810 as per subscription information. Note that the WTRU 1805 may still be able to access the operator's network and establish a PDN connection though a regular PGW. A MRA session may be initiated from a CSG without LIPA permission within the same local network 1815.

Figure 17:
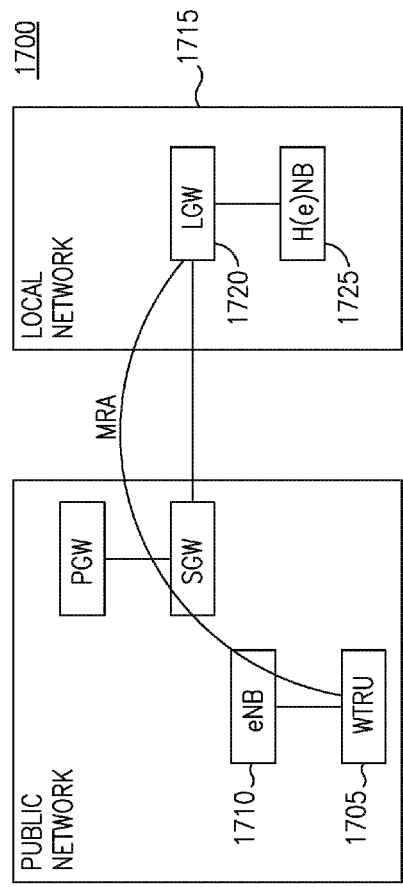
FIG. 17 shows a first scenario in which a MRA session may be initiated from outside a local network with or without LIPA permission.

A number of issues may be identified with the two scenarios specified above. A WTRU connected to either a macro cell or a H(e)NB cell that is not part of its local network, (as shown in FIG. 17), may attempt to access local services through the MRA feature. One issue that may arise is how to handle the remote access if the cell is configured with a CSG that does not support LIPA services, (i.e., the source CSG does not support LIPA services). If a handover were to occur while the WTRU attempts to access local services through MRA, it is clear what steps to take if the target cell configured in an eNB/H(e)NB is defined as a CSG cell, and that CSG cell does not provide LIPA services for the WTRU, (i.e., the target CSG does not support LIPA services). A WTRU is able to access LIPA services through a LGW within a local network when connected to a H(e)NB configured with a CSG that supports LIPA services for this WTRU, as shown by CSG2 1830 in FIG. 18.

While remaining within the same local network, a WTRU 1805 may move to a cell which may be configured with CSG but does not support LIPA services for WTRU1, (e.g., CSG1 1825). If the WTRU attempts to avail of LIPA services in that cell, (e.g., CSG1 1825), the request may be rejected, as CSG1 1825 does not allow LIPA services for WTRU 1805. However, it is not clear what happens if the WTRU 1805 requests MRA services while connected to CSG1 1825 instead of LIPA services, (i.e., whether the WTRU 1805 should be allowed and what the system behavior is in this case). In addition, it is not clear what happens if the WTRU 1805 initiates a LIPA connection in CSG2 1830 and it attempts to handover to CSG1 1825, (i.e., whether the handover should be allowed, whether the LIPA connection should be treated as a MRA connection, and what the system behavior should be in this case).

Described herein are example methods that may fall under several system areas, for example, system access and mobility management, or mobility management and handover. To this end, the methods described herein below, even though grouped under these system areas, should not be limited to the system areas under which they are grouped. Moreover, the grouping is not intended to limit the applicability of the methods to a particular problem/system area. Thus, the methods are applicable to several system areas/procedures, (i.e., RRC, non-access stratum (NAS), or any other combination or layer), and may also be applied in combination with any other method under any other system area.

Embodiments for enhanced HeNB mobility with LIPA PDN connection are described herein below.

In the architectural configurations described above, the user path directly goes from the HeNB to the LGW located in the HeNB local network. Moreover, within the geographical area of a LN, (enterprise, shopping mall, airport, and the like), users may frequently move between the coverage area of HeNBs. In order to limit the signaling load on the core network, such intra-local network signaling or signaling within the boundary of the femto network's hosting party premise may be contained within the local nodes without core network involvement. When a WTRU moves from one HeNB to another within the coverage of the same LGW, the handover procedure may be performed without having the signaling going through the core network (CN) as shown in FIG. 15.

The source HeNB may send the handover request message to the target HeNB to request the handover. In this message, the HeNB may send WTRU context information required to setup the connection at the target HeNB together with the Correlation ID, LGW S5 tunnel endpoint identity (TEID) or any other information that enables the direct user path between the target HeNB and the LGW. Upon receiving this message, the target HeNB may reply back with the handover request acknowledge and inform the source HeNB which bearers it may accept. The target HeNB may then send a path switch request directly to the LGW to change the downlink data path towards the target HeNB. In this case, the LGW plays both the mobility management role and the local mobility anchoring point role that the pair MME-SGSN plays during the legacy path switch procedure. The target HeNB may also inform the HeNB GW about the handover so that the downlink data path for the CN traffic is also modified towards the target HeNB.

In the case where there is no HeNB GW deployed, the MME/SGW may be informed about the handover so that it switches the data path for the CN downlink traffic. This may be achieved by the LGW sending a message to the SGW to modify the user path towards the target HeNB when the LGW receives the path switch request. The LGW may send the path switch reply message after it receives the indication that the SGW has modified its user path.

In another alternative, and for the scenarios where there is traffic routed through the LGW, (LIPA and non-LIPA traffic), and there is traffic routed through another PGW located in the CN, two path switch procedures may be performed, (concurrently, if needed). One path switch procedure may be performed toward the LGW and the other path switch may be performed toward the MME. This may lead to a bearer modification procedure being executed toward the SGW and the PGW.

The enhanced mobility procedure may be applied to the architectural scenario where the LGW is located on the S1 path. The LGW in this case may act as a concentrator of HeNBs. The path switch request message may still go to the LGW and the LGW may switch the data path for a LIPA PDN connection. Since the LGW is on the S1 path, it may also change the user data path of any other CN PDN connection that the WTRU may have without informing any entity in the CN.

If a path switch procedure is executed directly between the HeNB and the LGW, the CN, (i.e., MME, SGW, SGSN, and the like), may not be aware of the new cell of the WTRU. This may cause the following problems. The CN may not be able to perform session management and mobility management procedures toward the correct cell serving the WTRU as the CN does not know the serving cell. This problem is particularly severe in the case of the standalone LGW described with respect to FIGS. 7 and 8.

Figure 19:
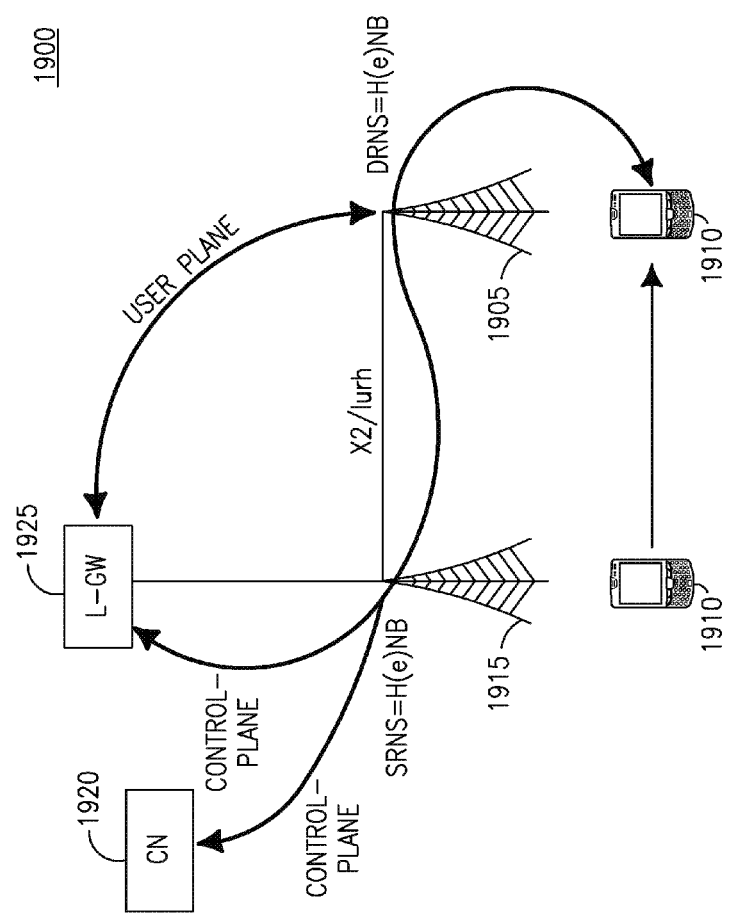
FIG. 19 shows an example of U-Plane and C-Plane signaling after non-serving radio network subsystem (SRNS) relocation handover.

In one embodiment to address this issue, a handover without serving radio network subsystem (SRNS) relocation i.e., a handover procedure where the SRNS of the WTRU remains the same before and after the handover or a similar handover procedure may be performed. FIG. 19 shows an example signaling diagram 1900 of U-Plane and C-Plane after a handover without SRNS relocation, wherein control signaling path is not changed but the user data path is switched to a target HeNB 1905. A WTRU 1910 may be handed over to the target HeNB 1905 in terms of radio resources allocation, (i.e., the target HeNB 1905 plays a drift radio network subsystem (DRNS) role and controls the radio resources used by the WTRU 1910), and supports a SRNS 1915 with these radio resources for the connection between the SRNS 1915 and the WTRU 1910. After the handover, the SRNS 1915 continues to be in charge of the radio connection between the WTRU 1910 and the RAN, (for example, an EUTRAN, UTRAN, and the like). The SRNS 1915 may terminate the S1 or Iu/Iuh. In this embodiment, the signaling in the control plane between the CN 1920 and the RAN, (traffic over S1-MME, Iu/Iuh, and the like), may continue to be routed through the SRNS 1915, (source and serving HeNB); there may be no path switch in the control plane. The user traffic, (user plane traffic over S1-U, Iu/Iuh), may be routed from a LGW 1925 directly to the target HeNB 1905.

Figure 20:
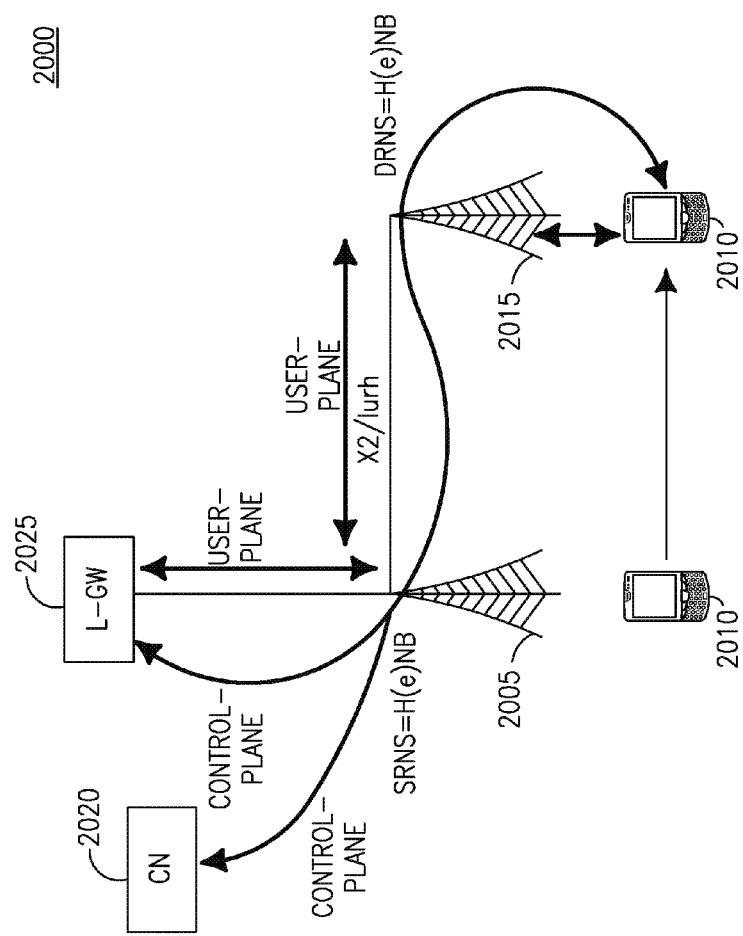
FIG. 20 shows another example of U-Plane and C-Plane signaling after SRNS relocation handover.

Alternatively, FIG. 20 shows an example signaling diagram 2000 of U-Plane and C-Plane after a handover without SRNS relocation, wherein both control signaling and data paths remains the same and routed through the SRNS/source HeNB 2005. A WTRU 2010 may be handed to a target HeNB 2015. After the handover, the SRNS 2005 continues to be in charge of the radio connection between the WTRU 2010 and the RAN, (for example, an EUTRAN, UTRAN, and the like). The SRNS 2005 may terminate the S1 or Iu/Iuh. In this embodiment, the signaling in the control plane between the CN 2020 and the RAN, (traffic over S1-MME, Iu/Iuh, and the like), may continue to be routed through the SRNS 2005, (source and serving HeNB); there may be no path switch in the control plane. The user traffic may be routed through the SRNS 2005, (source and serving HeNB), to a LGW 2025.

The embodiments for mobility without SRNS relocation and the related embodiments may be applied to the architectural configurations shown in FIGS. 7-12. Moreover, in the case of the architectural configurations shown in FIGS. 10-12, the control plane path and the user plane path may be switched using a single path switch procedure terminated by the LGW with no CN involvement.

Figure 21:
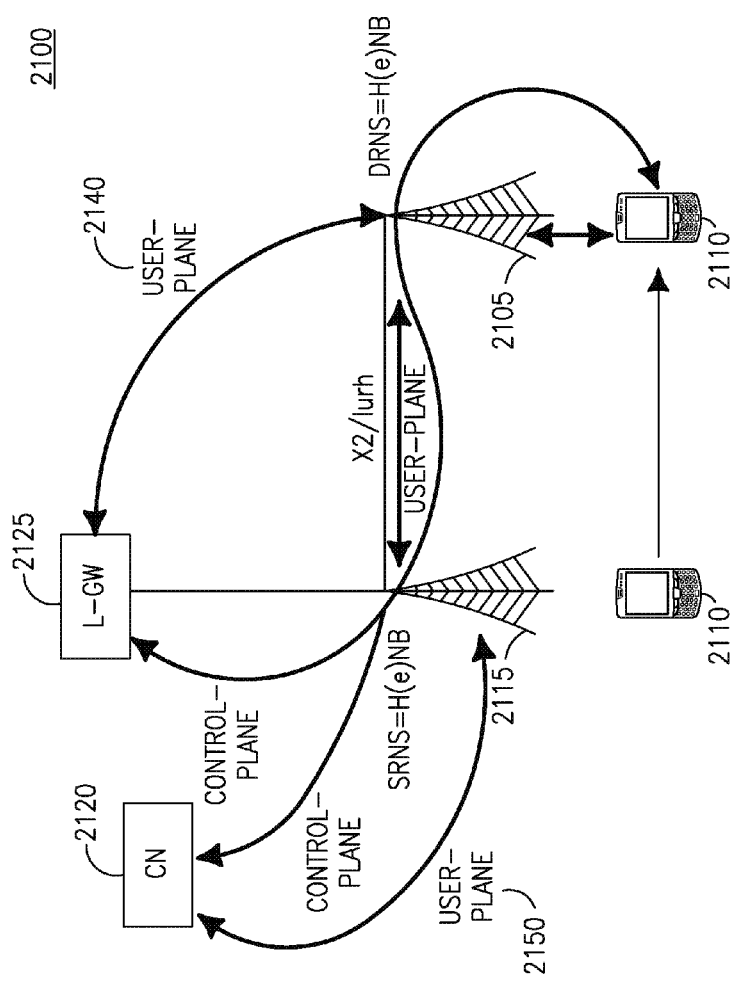
FIG. 21 shows another example of U-Plane and C-Plane signaling after SRNS relocation handover.

In another embodiment, FIG. 21 is an example signaling diagram 2100 of U-Plane and C-Plane signaling after handover without SRNS relocation, where a control signaling path remains the same, but where some data paths remain the same and some data paths are switched. A WTRU 2110 may be handed to a target HeNB 2105. After the handover, the SRNS 2115 continues to be in charge of the radio connection between the WTRU 2110 and the RAN, (for example, an EUTRAN, UTRAN, and the like). The SRNS 2110 may terminate the S1 or Iu/Iuh. In this embodiment, the signaling in the control plane between the CN 2120 and the RAN, (traffic over S1-MME, Iu/Iuh, and the like), may continue to be routed through the SRNS 2115, (source and serving HeNB); there may be no path switch in the control plane. The user plane path may remain the same and be routed to a LGW 2125 or be switched to a CN 2120. The non-SRNS relocation, (WTRU non-involved), handover may be executed for LIPA bearers or a set of bearers, (i.e., user-plane 2140), while a SRNS relocation handover may be performed for other bearers, (i.e., user-plane 2150). In such a case, two RNSs are performing the SRNS role, each RNS for a given subset of bearers or PDN connections.

The LIPA PDN may be allowed on a per CSG subscription basis. In this case, the subscription check may be performed locally before or during the handover procedure. The system may need to ensure that the WTRU subscription information allows LIPA services in the target CSG. The subscription information may not be checked in case of an intra-CSG handover.

The local subscription check may be performed using the following example methods. In one example method, a LGW may acquire the subscription information from the CN nodes upon establishment of a LIPA PDN connection. The LGW may check the subscription when it receives the path switch request message. If a LIPA connection is not allowed in the target HeNB, a path switch failure message may be sent to the target HeNB. In another example method, if there is an update in the subscription information, the new information may be sent to the LGW by the CN. A source or target HeNB may have the subscription information. These nodes may get this information either directly from the CN or from the LGW in the event that the LGW has the subscription information.

The handover procedure depicted in FIG. 14 may be modified when the HNB is connected to the LGW and the WTRU has an active LIPA PDN connection. When the target HNB receives the request for handover it may query the HNB-GW whether LIPA is allowed in the target cell in (2a) and (2b). This may assume that the HNB-GW already has LIPA CSG and LIPA subscription information from the CN. In (3), the target HNB may send an update TNL request to the LGW to create a tunnel between the target HNB and the LGW. In (4-6), the source HNB and the WTRU may be informed about the handover and the bearers which are supposed to be transferred to the target HNB. If the LIPA bearers cannot be transferred to the target HNB, the WTRU may be informed in (6) and may be asked to deactivate the LIPA PDP context.

After the WTRU receives the handover command in (6), it may connect to the target HNB. The target HNB may then send the relocation message to the HNB-GW to switch the user path towards the target HNB. In the case where LIPA PDP context is also being handed over, the path switch may take place at the LGW. This may be performed by the following example methods. In one example method, the target HNB may send two relocation complete messages in (8): one to the HNB-GW and the other to the LGW. When the LGW receives this message it may change the data path towards the target HNB. Alternatively, when the HNB-GW receives the relocation complete message, it may forward this message or an indication to the SGSN. The SGSN may then request the LGW to switch the path towards the target HNB.

Embodiments for LIPA bearer handling during mobility when LIPA is unaccessible are described herein. During mobility and when the LIPA bearers are not supported in the target cell, the HeNB may request, using intra-node signaling, the collocated LGW to release the LIPA PDN connection. The HeNB may determine that the WTRU has a LIPA PDN connection from the presence of the Correlation ID in the WTRU (evolved) radio access bearer ((E)RAB) context. The LGW may then initiate and complete the release of the LIPA PDN connection using the PGW initiated bearer deactivation procedure. The HeNB may not proceed with the handover preparation procedure towards the target RAN until the WTRU's (E)RAB context is clear for the Correlation ID. In the case of non co-located LGW, the deactivation may be initiated by the target cell, the LGW, or the CN, (for example, the MME, SGSN, HeNB-GW, and the like). For example, when the WTRU moves out of a LHN or moves into a target cell when the WTRU is not authorized for LIPA services, the LIPA bearer may be deactivated by the target cell, the LGW, or the CN, (for example, the MME, SGSN, H(e)NB-GW, and the like). The detection of the WTRU moving out of the LHN may be based on the change in the LHN identity.

In an alternative embodiment, the source HeNB, (or the target HeNB or any other node), may not deactivate the LIPA bearer regardless of whether or not the bearers are supported in the target cell. Instead, embodiments for LIPA bearer suspension and resumption described herein below may be used.

Described herein are example methods for LIPA PDN connection deactivation in CELL_FACH. A first example method may apply for LIPA PDN deactivation when a WTRU, in CELL_FACH state, moves out of an HNB, (for example to a macro cell), where a LIPA PDN connection exists.

The network, (for example UTRAN and/or SGSN), may deactivate the LIPA PDN connection during the cell update procedure or during CELL_FACH mobility. Alternatively, the deactivation may be done after the mobility has been executed.

If the WTRU knows that it has a LIPA PDN connection, the WTRU may perform a routing area update (RAU) during a cell update procedure, (i.e., sends a RAU instead of a cell update or sends a RAU in addition to cell update), as a result of CELL_FACH mobility even if the routing area identity did not change. If the WTRU knows it has a LIPA PDN connection, (based on an indication received from the network such as the SGSN in session management messages/procedures), then a RAU may be sent after a CELL_FACH mobility takes place and the WTRU moves/reselects another cell, (macro or HNB).

The SGSN may notice the WTRU's mobility as a result of a RNC relocation procedure, (during or after the relocation completes). The SGSN, may then trigger the deactivation of the LIPA PDN connection and therefore release the resources in the CN, (i.e., towards the LGW), and also towards the WTRU.

When the SGSN receives a request for RNC relocation from the target RNC, the SGSN may verify if the WTRU has moved to a new cell, (by checking the WTRU's context and comparing the potential/target RNC/target cell and the source RNC/cell to see if this has changed). Alternatively or additionally, the SGSN may compare the target cell identity, (that is provided via the relocation request), to the cell identity of the source cell where the LIPA PDN connection was established. If these two identities do not match, then the SGSN may conclude that the WTRU has moved, (or will be moving). Alternatively, the request for a relocation of the RNC may trigger the SGSN to deactivate the LIPA PDN connection towards the LGW and the WTRU.

Alternatively, the SGSN may verify if an LGW address is provided in the RNC relocation request. If yes, the SGSN may compare the LGW address to the LGW that is being used for the WTRU's LIPA PDN connection. If this is not the same, or if no LGW address was provided, the SGSN may conclude that the WTRU has moved out of the source cell. In the LTE Release 10 specifications, the LGW address is not included in the request towards the SGSN to perform RNC relocation. In one embodiment, such message/request may also include the LGW address that the target cell, (for example a target HNB), connects to. The relocation request towards the SGSN may be sent by the source RNC due to a cell update that is received from the WTRU at the target cell/RNC, (which triggers a relocation request towards the source and hence towards the SGSN). Embodiments are applied regardless if the relocation request to the SGSN is sent by the source RNC or the target RNC. In addition, the target cell/RNC may indicate to the source if the target cell connects to a LGW and if yes, may provide the LGW address.

Moreover, if the source RNC/HNB knows that the target RNC/cell does not support LIPA mobility, the source RNC/HNB may provide this indication to the SGSN as part of the relocation procedure. The source RNC/HNB may also indicate to the SGSN if the target RNC/HNB does connect to an LGW and also possibly provide the LGW address as indicated by the target RNC/cell/HNB.

If the SGSN concludes/notices that the WTRU has moved or will be moving, (i.e., during the request to perform RNC relocation), then the SGSN may deactivate the LIPA PDN connection and release the resources towards the LGW and/or the HNB, (where the LIPA PDN connection was established). Alternatively, the SGSN may release the resources towards the HNB, (where the LIPA PDN connection was established), which in turn releases the resources towards the LGW. The SGSN may also request the WTRU to deactivate the LIPA PDN connection during or after the RNC relocation is completed.

Throughout description herein, the RNC relocation request refers to the procedure of RNC relocation. The actual message between the RNC and the SGSN may be identified differently but the procedure may be the same. For example, the RNC relocation message that is actually used may be called "relocation required."

In an alternative embodiment, the source RNC, before sending the Relocation Required message to the SGSN, may first inform the LGW about the potential mobility. The LGW may in turn deactivate the LIPA PDN connection and indicate to the SGSN that the reason for the deactivation is due to mobility, RNC relocation or cell update, as indicated by the source HNB/RNC.

Throughout the description herein, the source RNC may refer to the source HNB, (i.e., they can be the same node and the source RNC may be used to refer to the source HNB, the source HNB GW or a source RNC node). Throughout the description herein, referring to an RNC may be interpreted as if the source RNC relays requests back and forth to the HNB, which may be the actual entity that is sending certain messages to the SGSN, (for example, relocation required). Thus, the source HNB GW may be acting as a relay node while the HNB is actually the source RNC. Alternatively, the RNC role may be assumed by the HNB GW, which in turn informs the HNB about the messages/procedures that are ongoing via other messages or by using the same messages as if the HNB was the actual RNC and the HNB GW was being a relay node. The HNB and/or the RNC may also take on the role to inform the LGW about the handover/RNC relocation and therefore the need to release the LIPA PDN connection towards the MME and between the LGW and the source HNB/RNC/HNB GW.

The HNB/source RNC may treat the LIPA PDN connection as if a connected mode handover is to take place, (i.e., the LIPA PDN connection is deactivated before the relocation). Moreover, the LGW may also inform the HNB about the completion of the deactivation which then triggers the source HNB/RNC/HNB GW to continue with the relocation request, (i.e., after the LIPA PDN deactivation has been done). The HNB may send the relocation request message to the SGSN. The SGSN may deactivate the LIPA PDN connection, (towards the LGW and/or SGSN if the S4 interface exists, and towards the WTRU), upon reception of the relocation request and thus may not include the LIPA context towards the target RNC.

Alternatively, if the LIPA PDN deactivation may be done before the request for relocation to the SGSN is sent, the SGSN may verify if the LIPA PDN connection has been released by the source RNC/HNB. If not, the SGSN may take the action to do so or may reject the relocation and indicate to the source RNC/HNB that the reason for rejection is that the LIPA PDN connection has not been deactivated. The source RNC/HNB may then first deactivate the LIPA PDN connection, (as per the same procedure used for connected mode handover), and the source RNC/HNB may then reattempt the relocation procedure towards the SGSN.

Alternatively, the SGSN may indicate to the source RNC, via the relocation command, that the LIPA PDN connection has been deactivated and the HNB may then inform the LGW to release the LIPA resources. Alternatively, the SGSN may inform the source RNC, (or source HNB), via the relocation command that the LIPA PDN connection needs to be released before the handover and the HNB may then proceed to inform the LGW about the need to deactivate the LIPA PDN connection. Alternatively, the source RNC/HNB/SGSN may first proceed with the handover/relocation without including the LIPA context to the target RNC and then in parallel or after the relocation is complete, the source HNB/RNC may inform the LGW to deactivate the LIPA PDN connection.

After the WTRU's CELL_FACH mobility is complete, the SGSN may trigger the deactivation of the LIPA PDN connection towards the WTRU. For example, when the SGSN receives the relocation complete message from the target RNC then the SGSN may deactivate the LIPA PDN connection towards the LGW, (if it has not done so already), and towards the WTRU.

If the CELL_FACH mobility, (for example, cell update procedure), leads to a change of SGSN, then the old/source SGSN may not forward the LIPA context to the target/new SGSN, (for example, in the Forward Relocation Request), and the source SGSN may not include the LIPA bearers or contexts.

The WTRU may disable CELL_FACH mobility if it knows that there is a LIPA PDN connection.

Alternatively, when the source RNC/HNB receives a request to perform RNC relocation, the source RNC/HNB may choose to not perform the relocation if there is a LIPA PDN connection active for the WTRU in question. Thus, the source RNC may remain the anchor point for both the control and data path. Moreover, the source RNC may keep forwarding the LIPA data to the target RNC via the established tunnel and the LIPA PDN connection is maintained. The SGSN may inform the source RNC/HNB to do so, for example, by rejecting the relocation request and using a new cause code to inform the source RNC/HNB to maintain the anchor point and forward the LIPA data towards the target RNC.

Alternatively, if the WTRU has non-LIPA bearers, the network may decide to deactivate the LIPA bearers and maintain the non-LIPA bearers even if no RNC relocation is performed. This may be based on a decision/configuration in the source RNC/HNB or may be based on a decision/configuration in the SGSN.

In another embodiment, the UPLINK SIGNALING TRANSFER message may be used by the target RNC to forward Uu messages received on the common control channel (CCCH) to the serving RNC (SRNC). A cell update is one of these messages. During the cell update procedure, upon receipt of an UPLINK SIGNALING TRANSFER message, the source RNC may verify the SRNC radio network temporary identifier (S-RNTI) and determine whether or not the WTRU that has moved to a target RNC had LIPA bearers. If the WTRU identified by the S-RNTI had LIPA bearers, then the source RNC may inform the collocated LGW that these bearers may be released.

The embodiment may depend on the chosen architecture. For example, the HNB may use the Sxx interface to release LIPA resources in the LGW. For architectural solution 1 as represented by FIGS. 7-9, either a new control protocol may be introduced or the Iuh or Iuhr protocols may be modified to allow the HNB GW or the HNB itself to request a release of the LIPA resources in the LGW.

All of the embodiments above may apply if the source RNC and the target RNC are the same nodes or if they are different nodes.

In LTE Release 11, the LGW may be standalone in a local network (LN) and thus WTRU mobility between HeNBs may not necessarily trigger deactivation of a LIPA PDN connection. For the case when a WTRU moves from a LN to the macro level, if LIPA service continuity is not provided from the macro cell, then LIPA PDN connection deactivation may be done. In this case, the embodiments for CELL_FACH mobility described herein above for LTE Release 10 may be implemented.

The following embodiments are provided for CELL_FACH mobility from one HeNB to another, assuming the WTRU has LIPA or SIPTO at LN PDN connection.

If the WTRU knows that it has a LIPA PDN connection, then the WTRU may include this indication in the cell update message, (this may apply even if the cell update is not due to mobility in CELL_FACH). When the target cell, (a source cell may also be a target cell), receives a cell update message, (not only due to mobility in CELL_FACH), the target cell/HeNB may inform the CN, (for example the SGSN), about the cell ID of the target cell to which the WTRU is sending the cell update. This may be done via the RNC. The CN/SGSN may then use this information to decide whether or not the LIPA bearers/service may be continued at the target HeNB, for example, based on subscription information. The target cell may send this information to the CN before any context fetching is performed, (if necessary, for example, due to forward access channel (FACH) mobility between HNBs). Alternatively, this may be done after the WTRU context is fetched from the source HNB.

During a cell update procedure, (due to, for example, mobility of a WTRU in CELL_FACH), it may be verified whether or not the LIPA/SIPTO at the local network service may be continued at the target cell before the WTRU context is fetched and transferred to the target cell. This check may be done by the target cell by communicating with the source cell or by communicating with the CN, (which may be the SGSN). For example, the target HNB may inform the CN/SGSN that a cell update procedure is imminent for a WTRU in question. The SGSN may then verify if the LIPA/SIPTO service, if it exists for the WTRU, may be continued at the target cell. The SGSN may respond to the target HNB and indicate if the cell update can be accepted and whether or not the LIPA/SIPTO service may be continued. The SGSN may also provide the LGW address and/or any other information that is necessary to continue the LIPA/SIPTO service. The information may be, for example, a correlation ID. This check with the CN may be performed after the context has been fetched for a WTRU. The presence of such address information from the SGSN may imply to the target cell that LIPA/SIPTO may be maintained for the WTRU. The CN may provide information to the target cell whether the service is LIPA, SIPTO, or both. If the rules/subscription indicate(s) that the WTRU may have service continuity at the target, the CN/SGSN may reject the cell update. This may lead to the failure of the procedure or redirection of the WTRU back to the source cell.

The CN may perform the check before or after the cell update procedure. The verification done by the CN may involve determining if the LIPA/SIPTO at the local network may be provided at the target. This may be based on WTRU subscription information and/or whether or not the target cell connects to the HNB, and the like. The CN may decide to deactivate the LIPA/SIPTO PDN connection, for example, if the service may not be maintained at the target. This deactivation may be done before or after the cell update procedure is completed.

The source cell may verify if the target cell may provide LIPA/SIPTO service continuity for the WTRU. This may be based on whether the target cell connects to the LGW and/or whether the WTRU's subscription allows this service continuity at the target cell. This information may already be available at the source cell. Alternatively, the source cell may probe the CN node, (which may be the SGSN or LGW), to verify if this LIPA/SIPTO PDN connection may be maintained at the target cell. The source may send this indication to the SGSN and provide the identity of the target cell and the LGW so that the SGSN may respond to the source cell and indicate if the LIPA/SIPTO may be maintained at the target cell. If the SGSN/CN indicates that this service(s) may be maintained, the source may then provide the context to the target cell and also include the LIPA/SIPTO context/bearers/information.

Alternatively, if the CN/SGSN indicates that the service cannot be maintained at the target cell, the source cell may inform the LGW to deactivate the LIPA/SIPTO PDN connection. The SGSN may also perform this deactivation and indicate that to the source HNB. The source/target cell and the CN/SGSN may exchange information via the requests/responses described herein above by using existing messages or new messages over the interface used for communication between these nodes. This is applicable to all embodiments described herein above. Thus, the source cell, based on local information or information from the CN/SGSN may decide to include or not include the LIPA/SIPTO context/bearers/information to the target cell as part of the cell update procedure. If the service can be maintained, the target cell may inform the LGW to create the tunnels/user path for the LIPA/SIPTO traffic. Alternatively, the CN or the source HNB may inform the LGW to update the data path towards the target HNB based on the decision of whether the service may be maintained at the target cell.

Embodiments for LIPA bearer suspension and resumption are described hereafter. A seamless LIPA mobility may be accomplished through LIPA bearer suspension and resumption. When the WTRU moves out of LIPA coverage, the LIPA bearers may be suspended. The LIPA bearers may be resumed when the WTRU moves back to another cell which supports LIPA. During the handover procedure when the source cell determines that the LIPA bearers cannot be handed over to the target cell, the source cell does not inform the LGW, the MME or any other node to remove the context for these bearers and deactivate LIPA PDN connection. It may send a special indication to the LGW and the CN nodes that the PDN connection is still active but there are no bearers currently setup in the target cell. Upon receiving this indication the LGW may start buffering all the downlink (DL) traffic for the WTRU. The buffered traffic is sent to the WTRU when the WTRU enters the LIPA coverage and the LIPA bearers are resumed to LIPA traffic. There may be a timer in the network which starts when the LIPA bearers are suspended, and if the WTRU does not come back to the LIPA coverage before the timer expires, LIPA PDN connection may be deactivated and all the data buffered at the LGW may be discarded. This embodiment may also be applied to the scenario when the WTRU moves within the LN. The LIPA bearers may be deactivated when the WTRU moves out of the LN or moves into the coverage of the macro network.

When the WTRU goes into an idle mode and it has suspended the LIPA bearers, one or more of the following actions may be performed. In one action, a timer may be stopped and it may resume when the WTRU goes back to connected mode. In another action, when the WTRU performs tracking area update (TAU)/routing area update (RAU), the network may check if the cell the WTRU is camped on supports LIPA. If the cell supports LIPA, the bearers may be resumed and the LGW may send the buffered data to the WTRU. If the networks find out that the WTRU has moved out of the LN coverage then the LIPA PDN connection may be deactivated. In another action, when the networks send a paging message or when there is a service request, the network may try to resume LIPA bearers if the current cell supports LIPA and send the buffered data. The network may deactivate the bearer if the WTRU has moved out of the LIPA coverage.

Triggers for the LIPA bearer suspension include, but is not limited to, detection that the WTRU has moved out from the LN, detection that the target cell does not support LIPA, network policy based, network indication, user indication, and the like.

Triggers for LIPA bearer resumption include, but are not limited to, detection that the WTRU moved back to a LN coverage and has access rights to LIPA in the LN, detection that the target cell supports LIPA and the WTRU has access right to LIPA in the target cell, network policy based, network indication, expiry of a LIPA bearer resumption timer, user indication, and the like.

The initiator of LIPA bearer suspension may be the source cell. For example, during non-core network involved mobility, the source cell may initiate the LIPA suspension. LIPA suspension request or indication may be sent to the target cell as part of the handover request message, as part of any other relocation message or context transfer response message or in a separate message. The target cell may then relay such indication to the LGW, for example, in the path switch request message. The source cell may keep the WTRU context and may not delete the LIPA bearer configuration and/or the resources allocated toward the core network, (and/or the LGW), to support such bearers. The source cell may start a configurable timer. How long the source cell keeps the WTRU context and the associated LIPA bearers may be controlled by such a timer.

The initiator of LIPA bearer suspension may be the target cell. For example, during non-core network involved mobility, the target cell may initiate the LIPA suspension, for example, after the determination that the WTRU has no LIPA access in the target cell. The target cell may then send such indication to the LGW in the path switch request message, for example.

The initiator of LIPA bearer suspension may be the LGW. The LGW may be configured or have all the necessary information including user LIPA subscription information to initiate the LIPA bearer suspension.

The initiator of LIPA bearer suspension may be the core network including the HeNB GW. For example, during core network involved handover/relocation, the core network may initiate the bearer suspension.

The target cell may receive LIPA suspension request or indication. During non-core network involved mobility, upon reception of LIPA bearer suspension request/indication, the target cell may not allocate LIPA bearer resources. In addition, the target cell may include such request/indication, (explicitly or implicitly), in the handover command container, (sent to the WTRU via the source cell), to the WTRU. The target cell may relay the bearer suspension request/indication to the LGW, (or to the HeNB GW or to the core network in case of core network involved handover), for example, in the path switch request message. The target cell may forward to the subsequent target cell the LIPA bearer configuration information during subsequent handover or relocation.

The WTRU may receive LIPA suspension request/indication as part of a handover command as in any other RRC message. Upon reception of the LIPA bearer suspension request/indication, the WTRU may inform the application layer. The uplink LIPA bearer traffic may then be suspended. The WTRU may inform the core network or the peer WTRU of such suspension. The WTRU may also update its CSG white list accordingly to reflect the fact that the WTRU has no LIPA access in the target cell.

The LGW may receive the LIPA bearer suspension request/indication over the Sxx interface, the S1 interface, the Iuh interface, the S5 interface, or any other interface. Upon reception of the LIPA bearer suspension request/indication, the LGW may buffer downlink LIPA bearer traffic. The LGW may forward to subsequent target cell, the LIPA bearer configuration information during subsequent handover or relocation. The LGW may start a timer upon the suspension of the LIPA bearer.

The source cell may receive the LIPA bearer suspension request/indication. Upon receiving the LIPA bearer suspension request/indication, the source cell may keep the WTRU context and may not delete the LIPA bearer configuration and/or the resources allocated toward the core network, (and/or the LGW), to support such bearers. The source cell may start a configurable timer. How long the source cell keeps the WTRU context and the associated LIPA bearers may be controlled by such a timer.

The CN may receive the LIPA bearer suspension request/indication. The CN may include, but is not limited to, the HeNB-GW, MME/S-GW/PGW, SGSN/GGSN, and the like Embodiments for inter-RAT handover with LIPA PDN connection are described herein. Inter-RAT handover may be performed with LIPA PDN when HeNBs and HNBs are deployed under the same LGW. The WTRU may maintain seamless data connectivity to the local network or Internet through the LGW when moving between HeNBs and HNBs. Since this type of handover is between two different systems, the signaling may go through the CN. When the source cell decides to trigger the handover procedure, it sends the handover request message to its respective CN network nodes. For example, the HeNB sends the message to the MME and the HNB sends the message to the SGSN. In this message, the source cell may indicate that there is an active LIPA PDN connection and LIPA bearers need to be transferred to the target cell. The source system may send the message to the target system, (for example, the MME sends the message to the SGSN), asking if the LIPA bearers can be handed over. The source system may send the WTRU context information to the target system together with the Correlation ID or LGW S5 tunnel endpoint ID (TEID). The LGW address or some other LGW ID may also be forwarded to the target system to ensure that both cells are connected to the same LGW.

The bearer information, Correlation ID, and/or LGW address (or ID) may be sent to the target cell which may then decide if it can accept the LIPA bearers or not. The accepted bearer information is then sent to source system so that if some bearers are not accepted the source and the LGW release the resources for bearers. The target cell may create a user plan connection with the LGW and exchange uplink (UL) TEID with the LGW for the UL data.

In the case of a handover from the HeNB to the HNB, the LGW may create a connection with the SGSN. This connection may be created through a direct LGW-to-SGSN interface or indirectly via the SGW. In the first case, a new tunnel may be created between the LGW and the SGSN during the handover. There may be a new LGW TEID with respect to this tunnel. The SGSN may send this TEID as the Correlation ID to enable direct user path between the HNB and the LGW. In the second case, the S5 interface between the LGW and the SGW may not change during the handover so the same LGW S5 TEID may be used as the Correlation ID. The SGW may forward this TEID to the SGSN during the handover process which forwards to its respective HNB. The two embodiments described above may also apply to the HNB to HeNB handover.

Embodiments for inter-LGW mobility are described herein. Uninterrupted mobility may be supported when the WTRU moves from the coverage of one LGW to another LGW. When there is a change in LGW, the WTRU IP address or IP Point of Presence (POP) may be changed. This may cause disruption in the user plane data. To avoid this, data forwarding may be supported from the source LGW system to the target LGW system.

Figure 22:
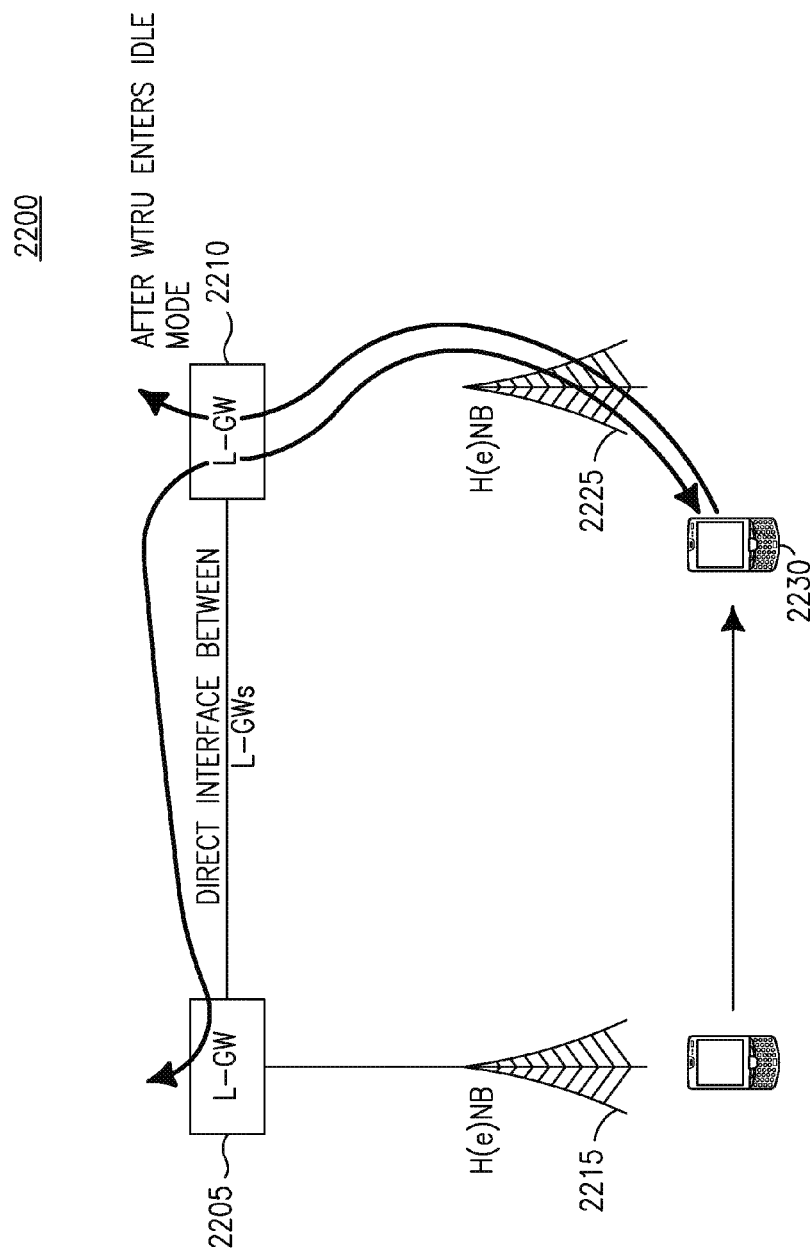
FIG. 22 shows an example direct interface between LGWs.

FIG. 22 shows an embodiment for a direct interface 2200 between a source LGW 2205 and a target LGW 2210. In particular, the direct interface 2200 may be provided between the source LGW 2205 and the target LGW 2210 for data forwarding for seamless inter-LGW mobility. During the handover procedure, a source HeNB 2215 may find out that a target HeNB 2225 is served by a different LGW, i.e., LGW 2210. The source HeNB 2215 may get this information from the MME (not shown), the LGW 2205 or the target HeNB 2225. The source HeNB 2215 may also acquire the target LGW 2210 address or some other type of identification. The target HeNB 2225 may notify the source HeNB 2215 if it supports inter-LGW handover with LIPA bearers. If the handover is supported and the target HeNB 2225 supports the establishment of the tunnel between the two LGWs, then the source HeNB 2215 may proceed with establishment of direct tunnels between the two LGWs. The source LGW 2205 may use the target LGW 2210 address provided by the source HeNB 2215 or the MME to establish the direct tunnel. After the direct tunnel is established, the source LGW 2205 may forward the user data to the target LGW 2210, which in turn will send the data to a WTRU 2230 via the direct path between the target LGW 2210 and target HeNB 2225.

The data forwarded to the target HeNB 2225 may be done using a number of methods. For example, the source LGW 2205 may remain the IP POP. When the WTRU 2230 moves to the new LGW, (i.e., the target LGW 2210), the WTRU 2230 IP address may not change. Whenever the source LGW 2215 receives data for the WTRU 2230, it may transfer the data to the target LGW 2210. The target LGW 2210 may act as a relay between the original LGW, (i.e., the source LGW 2205), and the target HeNB 2225.

Alternatively, the WTRU 2230 may establish a new PDN connection with the target LGW 2210. The target LGW 2210 may provide a new IP address to the WTRU 2230, and therefore this may become the WTRU's 2300 IP POP. The source LGW 2205 may forward data to the target LGW 2210 and the target LGW 2210 may transmit this data to the WTRU 2230 via new the PDN connection.

Figure 23:
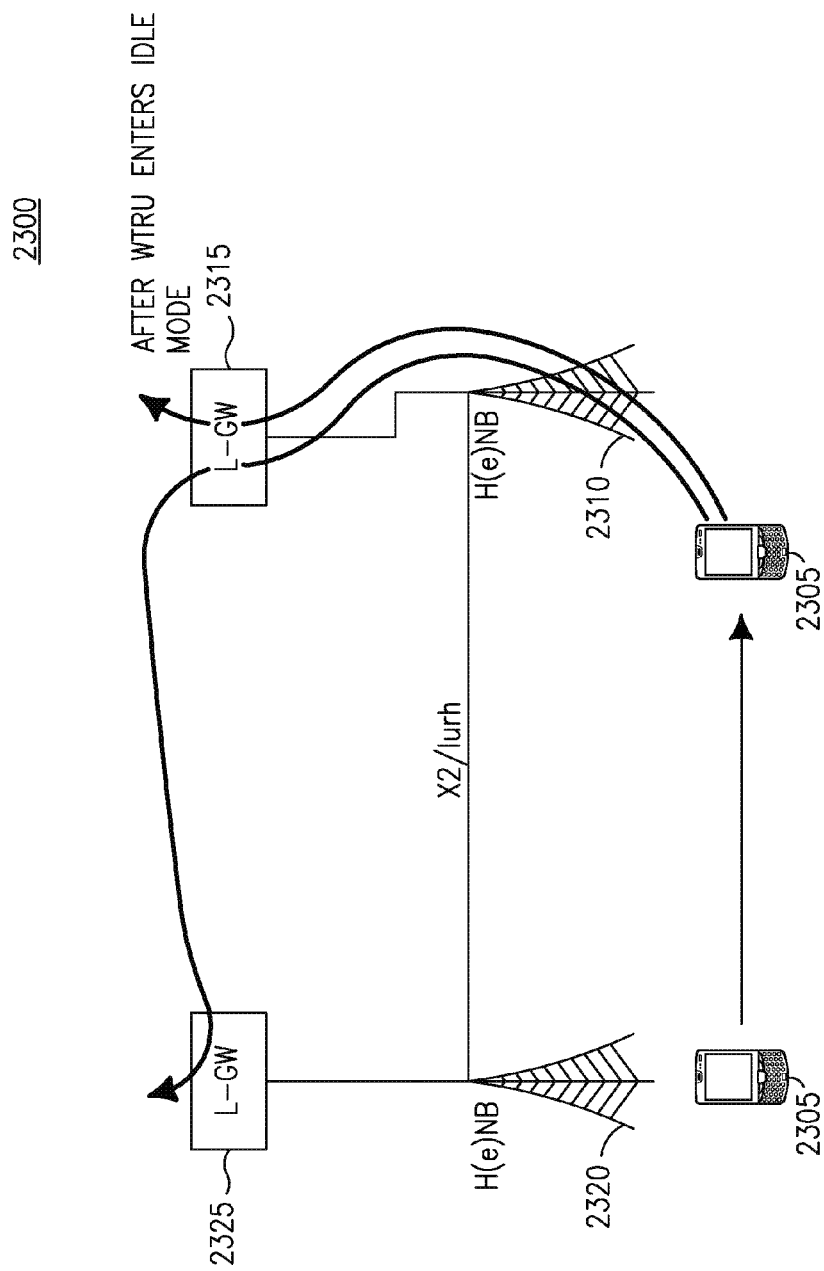
FIG. 23 shows an example of data forwarding via X2/Iurh.

FIG. 23 shows another embodiment where data forwarding is done via X2/Iurh interface 2300. In particular, the X2/Iurh interface 2300 may be used for data forwarding for seamless inter-LGW mobility. Data forwarding via X2 or Iurh interface 2300 may depend on the type of system. When a WTRU 2305 moves to a target HeNB 2310 with a different LGW 2315, a source HeNB 2320 may ask the target HeNB 2310 if it can maintain data continuity for the LIPA PDN connection via the X2 or Iurh interface 2300. The target HeNB 2310 may inform/respond to the inquiry from the source HeNB 2320 in a handover request acknowledge message. The target HeNB 2310 may then send a path switch request to the CN (not shown) and does not include the parameters to switch the path for the LIPA bearers. At the completion of the handover procedure, the source HeNB 2320 may have all the information needed to forward data for the LIPA PDN connection to the target HeNB 2310 via the X2 or Iurh interface 2300. Alternatively, the data may be forwarded from the source HeNB 2320 to the target LGW 2315 and then from the target LGW 2315 to the WTRU 2305 via the target HeNB 2310.

The embodiments described above may not require the target HeNB 2315 to be connected to the source LGW 2325 or the target LGW 2315 or any LGW, and the embodiments may be used to provide remote access to the local network via the source LGW 2325 through the X2/Iurh interface between HeNB 2320 and HeNB 2310.

In another embodiment, data forwarding may be performed through the SGW for seamless inter-LGW mobility. The existing S5 interface between the LGW and the SGW may be used to forward data from the source LGW system to the target LGW system. This embodiment assumes that both source and target LGWs are served by the same SGW. During the inter-LGW handover, the source HeNB may not deactivate the LIPA PDN connection when the WTRU moves out the coverage of the source LGW, instead the source HeNB may inform the target HeNB of the active LIPA bearers. If the target HeNB has the capability to support inter-LGW handover, it may request the SGW to create a session with the LGW as it would do it with any other PGW. The SGW may inform the LGW that the WTRU traffic may be routed through the SGW instead of being routed through the direct path.

The SGW functionalities may be modified because currently when the SGW receives data from the LGW, it sends the downlink data notification to the MME so that the MME can page the WTRU to bring it to a connected mode. However, in this embodiment, the SGW may forward the data directly to the WTRU. This issue may be solved by exchanging some information elements (IEs) when the S5 interface is established. These IEs may inform the SGW and the LGW whether the S5 tunnel is for user plane or to facilitate network initiated service request procedure.

Some LGW functionality may also be changed to support this embodiment. Currently, the LGW receives UL data from the HeNB but with this embodiment the LGW may also receive uplink data from the SGW. Therefore it may need to differentiate whether the data is being sent by the HeNB or the SGW. This may achieved by using two different correlation IDs. One correlation ID for the direct path between the HeNB and the LGW and the other correlation ID for the data going through the SGW.

The embodiment described herein above may not require the target HeNB to be connected to the LGW. Therefore, this embodiment may also be used to provide remote access to the local network via the source LGW.

In all the embodiments described herein above, the network may decide to change its PDN connection to the target LGW when the WTRU goes to the idle mode or when all the data sessions in the WTRU are inactive.

Embodiments for interaction between LIPA/SIPTO and support for equivalent PLMN and RAN sharing are described herein. LIPA requires that the operator be able to enable/disable LIPA per user subscription per CSG. This requirement is currently implemented by the operator defining in the subscriber user profile support for LIPA for access point names (APNs) that are valid when the WTRU is connected to a specific CSG. CSG has been specified on a PLMN basis. Currently, all ePLMNs are regarded as equivalent to each other for PLMN selection, cell selection/re-selection and handover. This implies that all ePLMNs shall be stored in the whitelist with the same CSG entries.

It has been assumed that all ePLMNs may not be stored in the whitelist. Based on this, the following were described which are not necessarily backward compatible with the support for equivalent PLMN. For membership check during WTRU-based mobility, (i.e., IDLE and UMTS PCH), the WTRU may consider the CSG-ID part of all broadcast PLMNs. The suitability check will consider registered PLMN (rPLMN)/serving PLMN (sPLMN)/ePLMN if (rPLMN/sPLMN/ePLMN, CSG-ID) is in the whitelist. In a connected mode when the WTRU is asked to report whether it is a member or a non-member, the WTRU considers itself a member only if the rPLMN is broadcast by cell and (rPLMN, CSG-ID) is in the WTRU's whitelist.

In one embodiment to provide backward compatibility with support to equivalent PLMN, for membership check during WTRU based mobility, (i.e., IDLE and UMTS PCH), or during mobility while the WTRU is in a connected mode, when a PLMN, (sPLMN, rPLMN, any other PLMN), is broadcast by a cell and the WTRU does not have this PLMN on its whitelist but rather an ePLMN associated with the CSG ID broadcast by the cell, the WTRU may consider itself a member and update its whitelist to include the ePLMN.

The WTRU may inform the network, (MME, SGSN, HeNB), of its whitelist update. The WTRU may initiate TAU/RAU as a result of the whitelist update even if there is no change of tracking area identity (TAI), routing area identity (RAI) or expiry of a TAU/RAU timer. The network may ask the WTRU to undo the update of the whitelist.

In addition, the WTRU may be configured by the network with permission as to whether the WTRU is allowed to use an equivalent PLMN in place of the PLMN broadcast by the CSG cell, and consider itself to be a member of the CSG. All PLMNs in the stored list, in all access technologies supported by the PLMN, may be regarded as equivalent to each other for PLMN selection, cell selection/re-selection and handover. In this context, the equivalent PLMN may be considered to be equivalent to the PLMN broadcast by the CSG cell.

Figure 25:
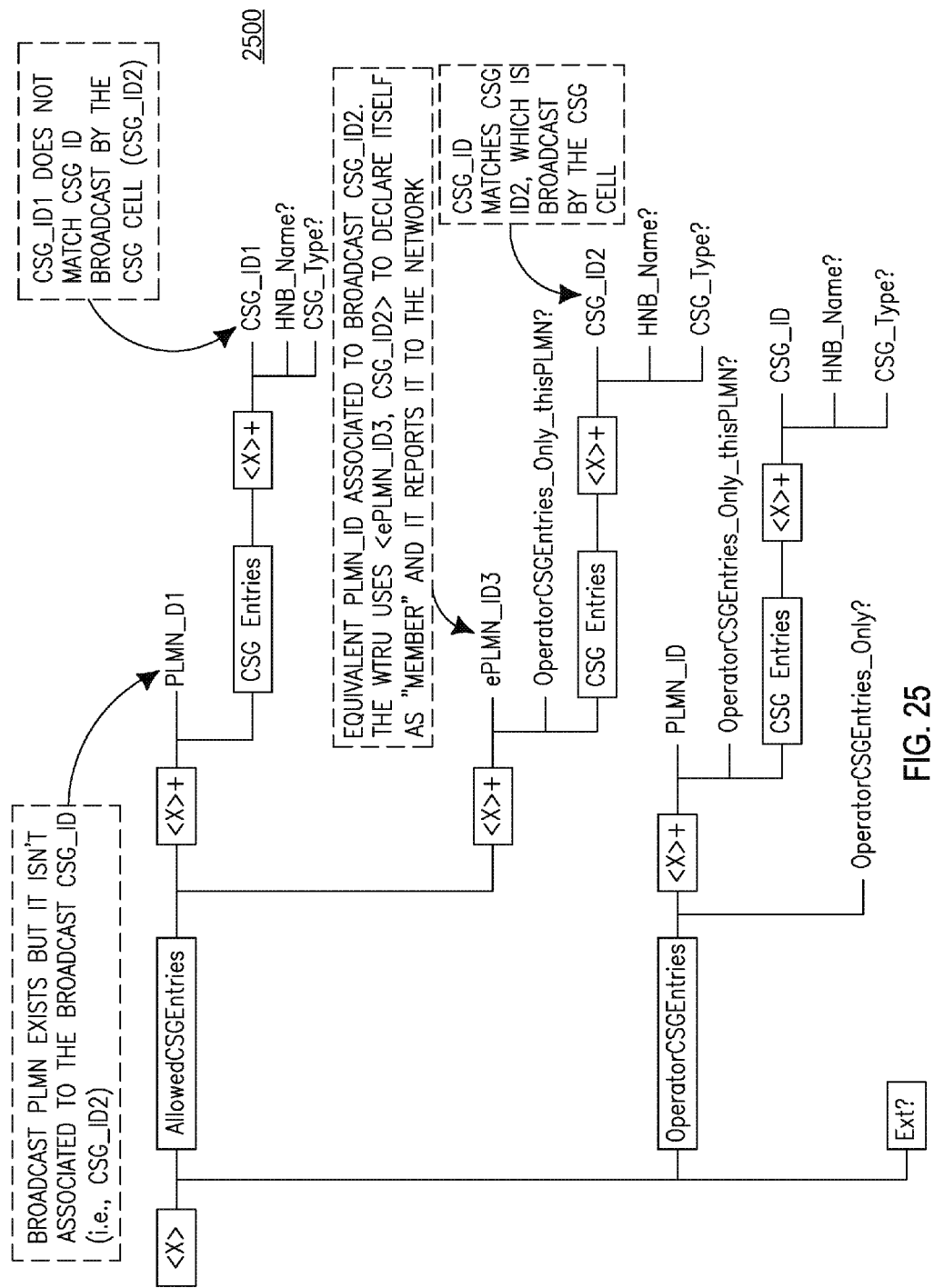
FIG. 25 shows an example WTRU white list.

In addition, the permission may also indicate whether the WTRU is allowed to report its membership status as "member" using the <CSG_ID, ePLMN> combination instead of the <CSG_ID, PLMN> combination broadcast by the CSG cell. FIG. 25 shows an example WTRU white list 2500 used for executing this procedure.

This permission may be signaled using NAS signaling, (for example an attach accept), RRC signaling, (for example a system information message) and the like. The permission may also be preconfigured at a network operator service center or configured by the operator via over-the-air (OTA) procedures through Open Mobile Alliance (OMA) device management (DM) or using an access network discovery and selection function (ANDSF) to push or pull this permission. The permission may also be part of the subscriber profile typically stored in a home subscriber server (HSS)/home location register (HLR). For example, this permission may be retrieved by a visited network and used to configure the WTRU, for example, during the network attachment procedure.

A WTRU that is configured with this permission may consider itself a member of any combination of a CSG's broadcast by a CSG cell, and an equivalent PLMN as long as this combination is part of its white list. A network entity within a relevant PLMN, (for example a mobility management entity (MME) or HeNB), that executes access check and membership verification for a WTRU that claims to be a member of a CSG_ID/ePLMN combination previously configured by the network, may allow network access to a WTRU that provides such combination based on the permission previously configured for this purpose.

In addition, during a cell reselection procedure, the WTRU may reselect to a CSG cell broadcasting a <CSG_ID, PLMN> combination, even if such combination is not included in the WTRU's white list. The WTRU may execute this procedure as long as the cell <CSG_ID, ePLMN> combination is included in the WTRU's white list. Furthermore, even if the WTRU may not be required to execute location update procedures due to, for example, accessing different tracking area (TA)/location area (LA)/routing area (RA), or due to a periodic update requirement, the WTRU may execute a location update procedure to allow the network to verify the membership credentials, and accordingly accept or reject the WTRU system access.

In another embodiment, the WTRU may initiate an RAU/TAU, (or any other appropriate NAS procedure), to inform the network of the change of PLMN and registration to this PLMN. If the registration is accepted, the WTRU may update its whitelist with an association between the ePLMN and the CSG ID broadcasted by the cell. In the context of RAN sharing, the cell may broadcast multiple PLMN IDs.

Some operators may offer LIPA for the CSG cell while some other operators may not offer LIPA on the same CSG cell. Moreover, between ePLMNs, there may be service discrimination. The operators may offer LIPA service to a subscriber for a given APN/CSG combination under a given PLMN while the same subscriber is not authorized to LIPA service for the same APN/CSG combination under a different PLMN despite the fact that both PLMNs are ePLMNs. When the WTRU sends a PDN connection request for LIPA service, it may include a list of possible CSG_ID/PLMN or CSG/ePLMN combinations in that cell in the request to the MME. The MME may then select the CSG_ID/PLMN that allows the WTRU to access LIPA service from that HeNB.

To take into account these possibilities, in one embodiment, the LIPA service access authorization may be defined based on a combination of APN, CSG and PLMN. In another embodiment, a cell may broadcast multiple CSG IDs on per PLMN basis. For example, there is one CSG ID broadcast per each PLMN sharing the cell.

In one embodiment, the non-SRNS relocation handover may be used in support of Remote IP Access (RIPA). When the WTRU is under the coverage of a given cell and needs a RIPA service, the connection may be setup using a serving RNS (HeNB subsystem) located in the WTRU local network and a drift RNS (HeNB, eNB, RNC/NB, and the like), providing coverage to the WTRU. The serving RNS may manage the WTRU connection while the drift RNS may provide radio resources. Both SRNS and DRNS may be within the same LN or in different LNs. Similarly, both SRNS and DRNS may be under the same LGW or under different LGWs.

With respect to access control rules between the SRNS and the DRNS, in one embodiment, the WTRU may be allowed to access if the WTRU has access credentials in SRNS, DRNS and/or the related CSGs. In another embodiment, the WTRU may be allowed to access as long as the WTRU has access credentials in the SRNS and/or the related CSGs. In another embodiment, the WTRU may be allowed to access as long as the WTRU has access credentials in the SRNS/DRNS and/or the related CSGs. In another embodiment, the WTRU may be allowed to access as long as the WTRU has access credentials in the SRNS and/or the related CSGs, or the DRNS and/or the related CSGs.

Enabling MRA and MRA-to-LIPA transfer and vice versa will now be described. In accordance with a first procedure, a PDN connectivity request, either standalone or as part of the attach procedure, may be sent from a cell for which LIPA cannot be provided to the WTRU. Hence, the connection to an LGW will be implemented as a MRA connection.

When a WTRU initiates a PDN connection request for a MRA session, a well defined APN for the local network or a special MRA indication may be included to indicate that this PDN connection is for a MRA session. The NAS message that carries the PDN connectivity request may include an LGW IP address, (as seen by the CN), or any LGW identification. This address/identity may be used by the MME to select the appropriate LGW. The WTRU may be configured with this information, for example, in the universal subscriber identity module (USIM) or may obtain this information from the CN nodes, for example, the ANDSF, domain name server (DNS) server or some other MRA application server, and the like. The identification may be the local home network (LHN) ID, for example. Alternatively, the RAN nodes may be configured with this information. The RAN nodes may include this information in every UL NAS Transport message (S1AP) or equivalent message in RANAP.

Upon receiving a PDN connection request for MRA, the MME may perform MRA authorization of the WTRU to decide whether the WTRU is allowed to use MRA service or not according to the WTRU subscription data and the MRA capability of the HeNB/HNB or the LGW. The MME may reject the PDN connectivity request if the MRA authorization fails. After successful MRA authorization, the MME may use the LGW address or/and the LHN ID provided to select the LGW in the local network.

For every PDN connection that is setup, (either as part of the attach procedure or during a standalone PDN connectivity request procedure), the MME/SGSN should indicate to the LGW/GGSN/PGW whether the connection is a LIPA connection, MRA, or other CN PDN connection, for example. This may be done by introducing a connectivity type IE or any other form of indication. For LTE, this may be done via the SGW. The connectivity type, (or any other equivalent IE), may be included in the create session request that is sent from the MME to the SGW, which then forwards the indication towards the LGW/PGW. In addition, this indication may also be sent to the SGW by the MME, either in PDN connectivity requests or during any signaling. For example, it may be sent as part of a handover procedure.

This indication will be used, (for example by the LGW), to decide whether or not a correlation ID or a S5 PGW TEID needs to be provided to specify the UL tunnel endpoint to be used by either an HeNB or a SGW. In other words, a correlation ID is needed only if a direct path is to be set up between the LGW and the HeNB/HNB. Thus, if the session is LIPA, the LGW should provide a correlation ID in the Create Session Response message. Otherwise, if the session is MRA, the direct path is not needed between an HeNB/NB and the LGW. Thus, the correlation ID need not be provided by the LGW in the Create Session Response, instead only the S5 PGE TEID needs to be provided.

In addition, the LGW may use the indication about the session being LIPA/MRA, (for example, the connectivity type or any other equivalent IE), to determine whether a dummy packet should be used when the WTRU is paged or whether the actual downlink data should be forwarded to the SGW as done by a core network PGW.

Figure 24:
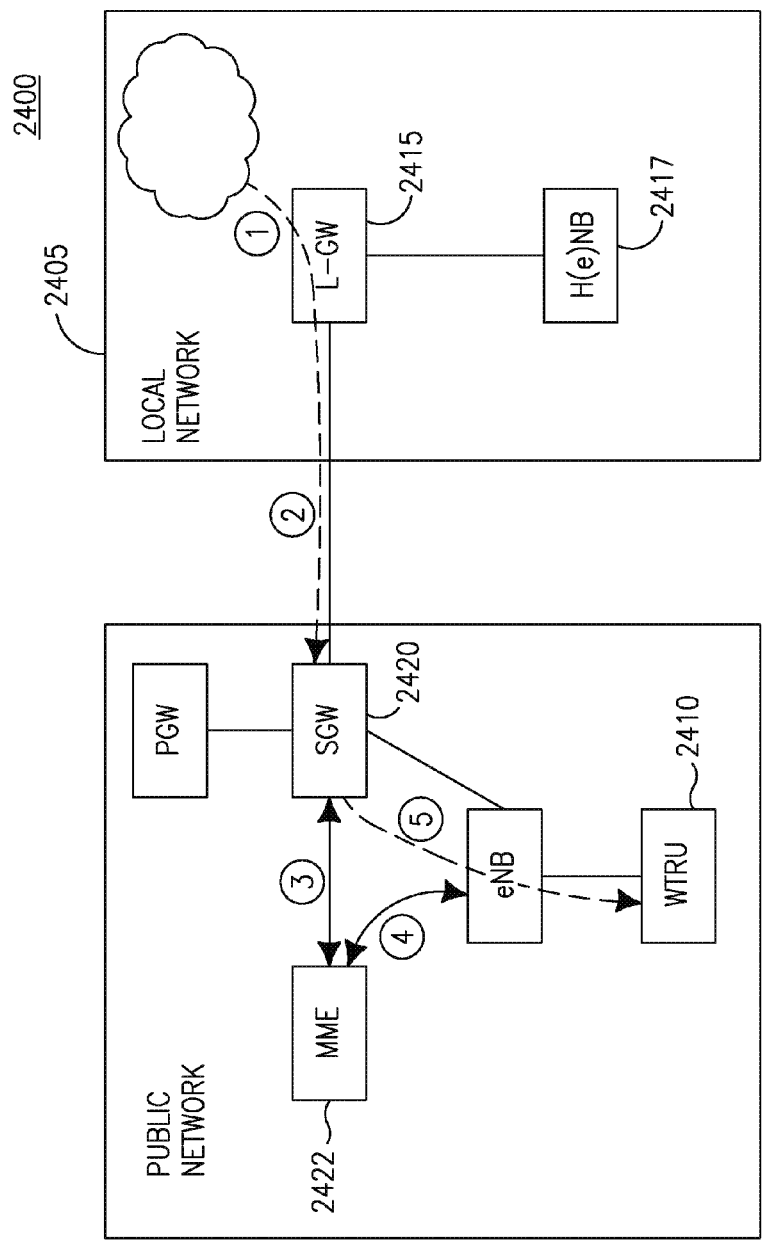
FIG. 24 shows an example MRA paging scenario.

FIG. 24 shows an example MRA paging scenario 2400. An entity within a LN 2405 may send downlink data for a WTRU 2410 in question (1). A LGW 2415 is assumed to be aware that the WTRU 2410 is in idle mode. The LGW 2415 may collocate with an HeNB 2417 or a standalone entity. Based on the indication about the PDN connection being MRA, (for example using the connectivity type), provided during the PDN connection establishment, the LGW 2415 may determine that the user data should be sent over the S5 DL data connection to a SGW 2420 (2). This may be different from a LIPA session for which the LGW 2415 may send a dummy packet to the SGW 2420 to trigger paging. A regular paging procedure may then be executed by a MME 2422 where the WTRU is paged in the macro network, (or in the HeNBs/HNBs 2417 of the LN 2405), and when it answers (3-5), the SGW 2420 may forward the buffered data intended for the WTRU 2410 accordingly (5).

Alternatively, at least one correlation ID may be provided by the LGW. This may be used if a MRA session is continued as a LIPA session. This may occur, for example, after a WTRU with MRA moves into a LN/cell where a LIPA session is allowed for the WTRU in question. Then, a direct path may be established between the HeNB/HNB and the LGW which would then use the already allocated correlation ID. Note that the correlation ID, if provided during a MRA session setup, would be stored at the MME/

SGSN until a potential LIPA session is started (i.e., until the MRA session continues as a LIPA session). At that point, the MME/SGSN may forward the correlation ID to the HeNB/HNB in the signaling messages that are performed as part of the handover, which is described herein below. In case the value of the correlation ID changes during the MRA session, the new correlation ID may be sent to the MME/SGSN. This may occur when the SGW changes the S5 TEID which may be part of the correlation ID that may change.

The MME/SGSN may also indicate to the serving cell that the session is a MRA session. This indication may be used by the cell during handover to choose a cell where the MRA session can continue as a LIPA session, for example. The information about the neighbors may be provided to all the cells, (source, target, macro, HeNBs/NBs, and the like). This may include, for example, whether or not LIPA is supported in general or for specific WTRUs and therefore which WTRUs, and whether or not MRA is supported in general or for specific WTRUs and therefore which WTRUs. This information may be provided by the CN nodes, for example, MME/SGSN/HSS/LGW or other nodes, for example, RNC or HNB GW.

Alternatively, a local home network (LHN) ID or LGW address as seen by the CN may also be provided by the LGW and this should be used to ensure that the MRA session continues as a LIPA session when the WTRU moves into the LHN where LIPA may be allowed. This LHN ID or LGW address may be stored in the serving MME or the serving eNB/HeNB. These parameters may also be used as an indication to the target eNB/HeNB during handover that there is an active MRA session. Also, in case of a handover to a local network, the target may compare the LHN ID or LGW address with its own address, and if it matches then the MRA session may be continued as an active LIPA session as specified herein below.

Described herein is handover into and out of a local network, (i.e., MRA to LIPA/LIPA to MRA). There may be two mobility scenarios to consider. In a first scenario, a WTRU in a local network has a LIPA session. The WTRU is then handed over in connected mode to a target cell that is not part of the LN such that the LIPA session may be maintained but as an MRA session. In a second scenario, a WTRU has an MRA session when out of the LN. In a connected mode, the WTRU is then handed over to a cell within the LN where LIPA is allowed for the WTRU. Thus, the MRA session is continued as a LIPA session in the LN.

For the first scenario, a LIPA to MRA session transfer (LtM) may apply to S1 or X2 handover, or similar mobility in 3G systems. During handover, the source or the target MME verifies whether the WTRU is allowed to have an MRA session in a target cell. The target cell may be any cell that doesn't belong to the LN or a cell that may belong to the LN but LIPA is not allowed due to subscription information, for example. There may be an inter-MME HO, however, for intra-MME the target is also the source MME.

During an S1 handover, the target MME may verify if MRA is allowed for the WTRU in the target cell. This verification may be done before the completion of the handover, or during the handover signaling so that the MME knows if the resources should be setup in the target cell or not. For example, when the MME receives a "handover required" message from a source cell as part of the S1 HO procedure, the MME may verify if an ongoing LIPA session can be maintained as MRA in the target cell.

If MRA is allowed, the MME may allow the handover to complete, otherwise, the MME may reject the handover and inform the source/target cell the reason for rejection is that the ongoing session cannot be maintained in the target cell as an MRA session. This information may be used by the source/target cell for future handovers of the WTRU in question. The reject cause may also indicate that MRA is not allowed from the target cell for all WTRUs. Thus, the source cell may take this information into account for future handovers such that no MRA session is attempted on the target cell.

Alternatively, the MME may allow the handover and the continuation of the LIPA session as a MRA session. After the handover, the MME may then perform the verification to see if the WTRU is allowed to have a MRA session from the target cell or not. If not, the MME may then initiate the release of the MRA-required resources towards other CN nodes and/or the RAN nodes.

If there is an inter-MME handover or an inter-RAT handover to a CN node such as an SGSN, an indication may be sent to the target MME informing it about the existence of a LIPA session. The target MME may then use this indication to verify if the LIPA session can be maintained as LIPA or MRA in the target cell.

The verification may also be performed by the source or target cell and all the other proposals above apply for the source/target cell as well. If this is to be done by the source/target, the source/target cell, (e.g., HeNB/HNB), should be provided with information about potential target cells where the WTRU is allowed to have a MRA session. This information may be provided to the source/target by the CN, (MME/SGSN, or LGW, or via OMA), or by the target cell itself if it has such information for the WTRU in question. For example, the target cell may provide such information during handover signaling that is sent back to the source cell, and the source cell may use this information for future handovers. During handover, the source/target cell may indicate, (via a new or existing IE), to the target cell/target MME that the WTRU has a LIPA session that should be maintained as a MRA session. The target cell/target MME then may verify this IE knows that the session is to be handled as a MRA session and resources should be setup towards the SGW as opposed to having a direct path towards a LGW. The target may be an HeNB/HNB that is part of another LN.

If the source cell doesn't know whether the session will be continued as LIPA or MRA in the target cell, the source cell may still keep all the LIPA related information. This may include the LIPA bearers, correlation IDs, and the like, in the handover messages. The target/source MME or target cell may then decide to keep the session as LIPA, resume it as MRA, or not handover any of the LIPA bearers. The LIPA bearers and related parameters may be identified so that the target cell/MME may know which bearers to continue as LIPA or MRA.

When the MME receives an indication from the target cell about the completion of the handover, and if the session is to be continued as a MRA session, the MME then may inform the SGW to start receiving/sending local network data from/to the LGW. This may be indicated in the Modify Bearer Request message or any other message. The SGW may in turn send a message to the LGW informing it about the change in the data path for the local network data. This may be done using the Modify Bearer Request message or any other. The SGW also includes the TEID to be used by the LGW for downlink data. The LGW also responds with the TEID to be used by the SGW in the uplink. Moreover, the LGW then releases the resources with the old cell, (i.e. the direct path). The MME is then notified about the completion of the resource setup. If the WTRU goes to idle mode while connected to the new cell and if user data is received for this WTRU, the LGW may need to execute procedures as described herein. For example the LGW may need to determine, based on the connectivity type, (or any other equivalent IE), that user data should be forwarded to the SGW, instead of sending dummy packets.

There may be both CN and LIPA traffic, (i.e., two PDN connections), for a WTRU before the handover. Thus, during the handover, the bearers associated with the PDN connection with the CN are handed over as per current procedures. The LIPA bearers are handled as described herein above. Furthermore, the MRA bearers/PDN connection may be identified so that any future handover to a LN where a session may be resumed as LIPA will then be done on the right bearers, i.e., the MRA bearers.

The procedures and scenarios described above may also apply in the case of X2 handover or similar handover procedures in 3G systems. With X2 handover, the MME may perform the methods described herein upon reception of the path switch request from the target cell. Note that the source cell may have included all the bearers including the LIPA bearers and thus leaving it up to the MME to verify if this can continue as LIPA or MRA, and take the necessary actions as described herein above. The source cell may identify the LIPA bearers and related information and the target cell may also perform the verification as described herein above. The procedures described herein above may apply in any combination and may be applicable to 3G or any other system with similar or same functionality.

In the second scenario, a MRA to LIPA session transfer may apply to both S1 or X2 handover (HO), or similar mobility in 3G systems. The procedure described herein above applies in this case as well. However, the source cell session is a MRA session and the target cell session is a LIPA session.

During handover of a WTRU with a MRA session into a target cell where LIPA may be supported, the source/target cell or MME/SGSN may check if LIPA is allowed for the WTRU so that the MRA continues as a LIPA session in the target cell. This determination may be performed as described herein above. If there is an inter-MME or inter-CN HO, (MME to SGSN or SGSN to MME, for example), then the source MME may indicate to the corresponding target node that the WTRU's session is a MRA session and should also identify the bearers and other necessary parameters that are used for MRA. The target MME/SGSN may use this information to verify if the target cell may continue the session as LIPA, MRA, or neither. The indication about the existing MRA session, MRA bearers and other MRA parameters, may also be sent from the source cell to the target cell in the handover messages.

During the handover, (or optionally after the handover), of a MRA session that may be continued as a LIPA session, the direct path for LIPA data between the target HeNB/HNB and the LGW should be setup. The setting up a direct path between the LGW and the HeNB also means that the LGW may need to send dummy packets or the first packet through the S5 DL interface instead of forwarding the actual user plane packet to the SGW if the WTRU goes to IDLE mode and DL data is received for this WTRU. Moreover, the resources between the SGW and the LGW for the user plane should be released. However, some communication and resources are maintained between these two nodes, as per current procedures, to enable paging for LIPA traffic when a WTRU is in idle mode. The session may continue as a MRA session for a short time and then transform into a LIPA session. That is, the MRA session may continue at the target cell during the handover of the WTRU which might mean that the LIPA traffic still goes through the SGW and the LGW in the uplink direction, and vice versa for the downlink. After the handover is complete, the session may then be changed to LIPA and the direct data path may be setup.

During the handover, if the WTRU is allowed LIPA in the target cell, the source cell/MME may include an indication in the Handover Request message, which is forwarded to the target cell, such that a direct path is established between the HeNB/HNB and the LGW. At least one correlation ID might also be included and this ID might have been allocated by the LGW during the initial PDN connection establishment for the WTRU. Alternatively, the MME might also allocate at least one correlation ID in conjunction with the LGW.

Alternatively, when the target MME/SGSN receives a handover request, (for example, a "handover required" message for S1 HO, or Path Switch Request for the X2 HO procedure), the MME/SGSN may contact the LGW and indicate the potential change of MRA to LIPA session. This may be done via the SGW. Thus, the LGW may, upon reception of this indication, provide at least one correlation ID for the LIPA bearers to the MME/SGSN, optionally via the SGW. Thus, the MME may then include at least one correlation ID in the Handover Request or Path Switch Request Ack message to the target cell. The source cell/MME/SGSN may also include an explicit indication to the target cell to notify that certain bearers are related to LIPA.

Upon the reception of the Handover Request or Path Switch Request Ack message by a target cell, the target cell may verify if there is any correlation ID or any explicit LIPA or MRA indication. If there is at least one correlation ID, the target cell may contact the LGW to setup resources for the direct path that is to be used for the LIPA traffic. The indication may include that the session should be a LIPA session. The LGW may start forwarding downlink LIPA bearers towards the HeNB/HNB via the direct path after the HeNB/HNB contacts it to setup the direct path.

Alternatively, the MME may indicate to the SGW, using the Modify Bearer Request message or any other message, that the session should be maintained as a LIPA session. This SGW may then clear the resources used for LIPA traffic. This may be done after the direct path between the LGW and the HeNB/HNB has been setup. Moreover, the SGW may also forward/inform the LGW that the session in question should be continued as a LIPA session. The LGW may, upon reception of an indication to continue a session as LIPA, allocate at least one correlation ID to be used for setting up the direct path. This information is sent back to the MME/SGSN. This may be done via the SGW. The MME/SGSN may also forward this information to the target HeNB/HNB. The explicit indication may specify that some of the bearers are for LIPA session. If the direct path has not been setup, the HeNB/HNB may then setup the direct path with the LGW upon the reception of at least one correlation ID or any other explicit indication for LIPA.

Alternatively, the LGW may also contact the target HeNB/HNB directly using TEID information provided by the MME/SGSN, for example, using the modify bearer request message. This may be done via the SGW. The MME/SGSN/SGW may include TEID information received from the target HeNB/HNB in a previous step. This may be used together with an indication about LIPA that is sent in a message to the LGW, where the message may be a modify bearer request message. The LGW may then use this information to contact the HeNB/HNB so that a direct path is setup for LIPA bearers. The LGW may also directly provide the target HeNB/HNB the correlation ID to be used, (the LGW may also provide this information to the MME/SGSN), for the LIPA traffic. This may be done via the SGW using the modify bearer response message.

All of the above procedures may be applicable to LTE systems, 3G systems and any other system with similar functionality. Moreover, even though the signaling messages and examples used are in the context of LTE, the same may be applicable to other systems using similar messages. Even though the procedures described herein are explained for LIPA, the same procedures may be applicable to SIPTO at the local network. All the embodiments described herein are equally applicable to 3G, LTE systems and any other wireless systems.

Although features and elements are described above in particular combinations, one of ordinary skill in the art will appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RANI), a register, a cache memory, a semiconductor memory device, a magnetic media, (e.g., an internal hard disc or a removable disc), a magneto-optical media, and an optical media such as a compact disc (CD) or a digital versatile disc (DVD). A processor in association with software may be used to implement a radio frequency transceiver for use in a WTRU, UE, terminal, base station, Node-B, eNB, HNB, HeNB, AP, RNC, wireless router or any host computer.

What is claimed is:

1. A first internet protocol (IP) anchor point configured to perform inter-IP anchor point mobility, the first IP anchor point comprising:
   a processor operatively coupled to at least one interface;
   the processor and the at least one interface configured to provide, to a wireless transmit/receive unit (WTRU), access to a data network by forwarding, from the data network, first data with a first IP address associated with the WTRU;
   the processor and the at least one interface configured to receive, from a network node, an indication to forward traffic from the data network intended for the WTRU to a second IP anchor point, wherein the second IP anchor point is connected to the data network and has a second IP address, and wherein the second IP anchor point provides, to the WTRU, access to the data network by forwarding, from the data network, second data, intended for the WTRU, with the second IP address associated with the WTRU; and
   the processor and the at least one interface configured to forward, to the second IP anchor point, third data with the first IP address from the data network intended for the WTRU.

2. The first IP anchor point of claim 1, wherein:
   the processor and the at least one interface are further configured to notify a second network node of the second IP anchor point.

3. The first IP anchor point of claim 1, wherein:
   the processor and the at least one interface are further configured to establish a tunnel with the second IP anchor point.

4. The first IP anchor point of claim 1 configured to serve a first home evolved node B (HeNB), wherein the second IP anchor point serves a second HeNB and the WTRU is handed over from the first HeNB to the second HeNB.

5. The first IP anchor point of claim 1 connected to a local network of the WTRU.

6. The first IP anchor point of claim 1, wherein the WTRU enters idle mode prior to the processor and the at least one interface forwarding, to the second IP anchor point, the third data.

7. A method, implemented at a first internet protocol (IP) anchor point, for inter-IP anchor point mobility, the method comprising:
   providing, to a wireless transmit/receive unit (WTRU), access to a data network by forwarding, from the data network, first data with a first IP address associated with the WTRU;
   receiving, from a network node, an indication to forward traffic intended for the WTRU to a second IP anchor point, wherein the second IP anchor point is connected to the data network and has a second IP address, and wherein the second IP anchor point provides, to the WTRU, access to the data network by forwarding, from the data network, second data, intended for the WTRU, with the second IP address associated with the WTRU; and
   forwarding, to the second IP anchor point, third data with the first IP address from the data network intended for the WTRU.

8. The method of claim 7, further comprising:
   notifying a second network node of the second IP anchor point.

9. The method of claim 7, further comprising:
   establishing a tunnel with the second IP anchor point.

10. The method of claim 7, further comprising:
    serving a first home evolved node B (HeNB), wherein the second IP anchor point serves a second HeNB and the WTRU is handed over from the first HeNB to the second HeNB.

11. The method of claim 7, wherein the first IP anchor point is connected to a local network of the WTRU.

12. The method of claim 7, wherein the WTRU enters idle mode prior to the forwarding, to the second IP anchor point, of the third data.

13. A first internet protocol (IP) anchor point configured to perform inter-IP anchor point mobility, the first IP anchor point comprising:
    a processor operatively coupled to at least one interface;
    the processor and the at least one interface configured to provide, to a wireless transmit/receive unit (WTRU), access to a data network by forwarding, from the data network, first data with a first IP address associated with the WTRU;
    the processor and the at least one interface configured to receive, from a second IP anchor point, an indication of a connection for forwarding traffic from the data network intended for the WTRU, wherein the second IP anchor point is connected to the data network and has a second IP address, and wherein the second IP anchor point provides, to the WTRU, access to the data network by forwarding, from the data network, second data, intended for the WTRU, with the second IP address associated with the WTRU; and
    the processor and the at least one interface configured to receive, from the second IP anchor point, third data with the second IP address from the data network intended for the WTRU; and the processor and the at least one interface configured to forward, to the WTRU, the third data.

14. The first IP anchor point of claim 13, wherein the processor and the at least one interface are configured to forward, to the WTRU, the third data with the second IP address.

15. The first IP anchor point of claim 13 wherein:
the processor and the at least one interface are further configured to assign a third IP address to the WTRU, wherein the processor and the at least one interface are configured to forward, to the WTRU, the third data with the third IP address.

16. A method, implemented at a first internet protocol (IP) anchor point, for inter-IP anchor point mobility, the method comprising:
providing, to a wireless transmit/receive unit (WTRU), access to a data network by forwarding, from the data network, first data with a first IP address associated with the WTRU;
receiving, from a second IP anchor point, an indication of a connection for forwarding traffic from the data network intended for the WTRU, wherein the second IP anchor point is connected to the data network and has a second IP address, and wherein the second IP anchor point provides, to the WTRU, access to the data network by forwarding, from the data network, second data, intended for the WTRU, with the second IP address associated with the WTRU; and
receiving, from the second IP anchor point, third data with the second IP address from the data network intended for the WTRU; and
forwarding, to the WTRU, the third data.

17. The method of claim 16, wherein the third data is forwarded, to the WTRU, with the second IP address.

18. The method of claim 16, further comprising:
assigning a third IP address to the WTRU, wherein the third data is forwarded, to the WTRU, with the third IP address.

* * * * *